United States Patent
Agarwal et al.

(10) Patent No.: US 10,075,370 B2
(45) Date of Patent: *Sep. 11, 2018

(54) NETWORK PERFORMANCE DIAGNOSTICS SYSTEM

(71) Applicant: Cisco Technology, Inc., San Jose, CA (US)

(72) Inventors: Anand Brahmanad Agarwal, Bangalore (IN); Vinay Narayana Rai, Bangalore (IN); David Alexander Ball, Herts (GB); Balaji Thulasinathan, Chennai (IN); Rajeeva Kowshika Ramesh, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/388,266

(22) Filed: Dec. 22, 2016

(65) Prior Publication Data

US 2017/0104677 A1    Apr. 13, 2017

Related U.S. Application Data

(63) Continuation of application No. 14/495,446, filed on Sep. 24, 2014, now Pat. No. 9,558,057.

(60) Provisional application No. 61/926,711, filed on Jan. 13, 2014.

(51) Int. Cl.
*H04L 12/721* (2013.01)
*H04L 12/26* (2006.01)
*H04L 29/06* (2006.01)

(52) U.S. Cl.
CPC .......... *H04L 45/70* (2013.01); *H04L 43/0823* (2013.01); *H04L 43/0852* (2013.01); *H04L 65/4076* (2013.01)

(58) Field of Classification Search
CPC . H04L 45/70; H04L 65/4076; H04L 43/0823; H04L 43/0852
See application file for complete search history.

(56) References Cited

U.S. PATENT DOCUMENTS

| | | | | |
|---|---|---|---|---|
| 7,286,528 | B1 * | 10/2007 | Pannell | ............... H04L 12/4625 370/389 |
| 9,602,402 | B2 * | 3/2017 | Jeong | .................... H04L 67/303 |
| 2006/0126622 | A1 * | 6/2006 | Park | .................. H04L 29/12009 370/389 |

(Continued)

OTHER PUBLICATIONS

Ethernet Connectivity Fault management, dated Jan. 2, 2008, pp. 1-76, Cisco, San Jose, California.

(Continued)

*Primary Examiner* — Mohammad S Anwar
(74) *Attorney, Agent, or Firm* — Edell, Shapiro & Finnan, LLC

(57) ABSTRACT

In one embodiment, a network device is configured to generate a control protocol packet containing a source address of the network device and a destination address. The network device is configured to translate the source address to a interface device address of a first communication interface device included in the network device. The control protocol packet can be transmitted over the network by a second communication interface device included in the network device for receipt by a device based on the destination address.

20 Claims, 18 Drawing Sheets

(56) References Cited

U.S. PATENT DOCUMENTS

| | | |
|---|---|---|
| 2006/0153220 A1* | 7/2006 | Elie-Dit-Cosaque ........................ H04L 12/4625 370/432 |
| 2009/0158388 A1 | 6/2009 | Sridhar et al. |
| 2009/0161672 A1 | 6/2009 | Shimada |
| 2010/0182902 A1 | 7/2010 | Saltsidis |
| 2010/0290343 A1 | 11/2010 | Tanaka et al. |
| 2012/0294154 A1 | 11/2012 | Missett et al. |
| 2013/0136128 A1* | 5/2013 | Robinson ................ H04L 45/74 370/392 |
| 2014/0169785 A1 | 6/2014 | Roullot |
| 2015/0200827 A1 | 7/2015 | Agarwal et al. |

OTHER PUBLICATIONS

Ethernet Connectivity Fault Management—Chapter 7, dated Jan. 22, 2010, pp. 7.1-7.10, Cisco, San Jose, California.

Ethernet OAM Connectivity Fault Management, dated Jun. 26, 2012, p. 1, Juniper Networks, Sunnyvale, California.

ITU-T Y.1731 Performance Monitoring in a Service Provider Network, dated Mar. 30, 2011, pp. 1-10, Cisco, Sna Jose, California.

OE Solutions and AimValley Team Up on Next Generation Optical Transceivers, dated Dec. 14, 2011, pp. 5-6, AimValley, Hilversum, The Netherlands.

OE Solutions and AimValley Announce Smart SFP, dated Feb. 29, 2012, pp. 4-5, AimValley, Hilversum, The Netherlands.

Smart SFP—Gigabit Ethernet OAM, dated Oct. 8, 2013, pp. 1-2, OE Solutions/AimValley, Gwangju, Korea and Hlversum, The Netherlands.

Y.1731 Performance Monitoring, dated Nov. 27, 2013, pp. 73.1-73.6, Cisco, San Jose, California.

* cited by examiner

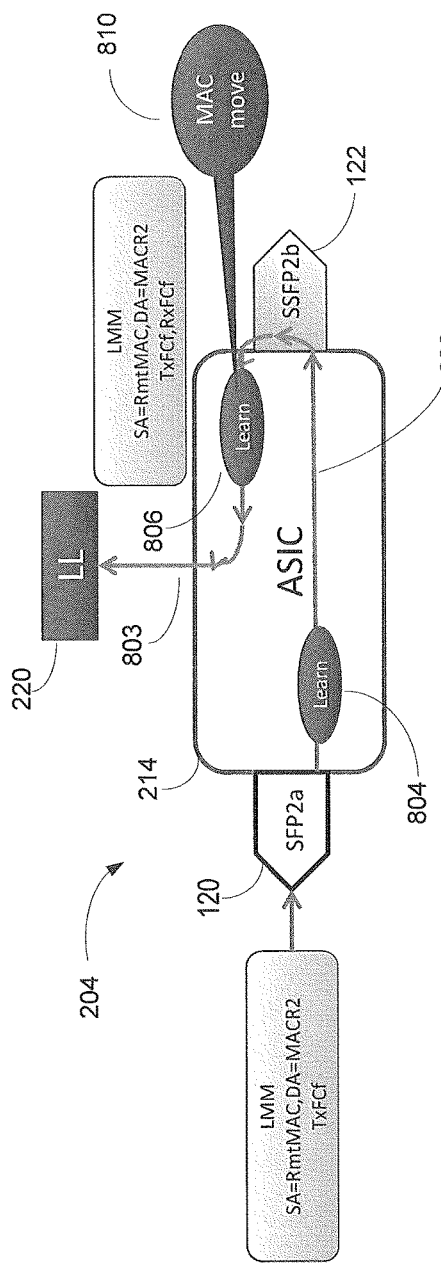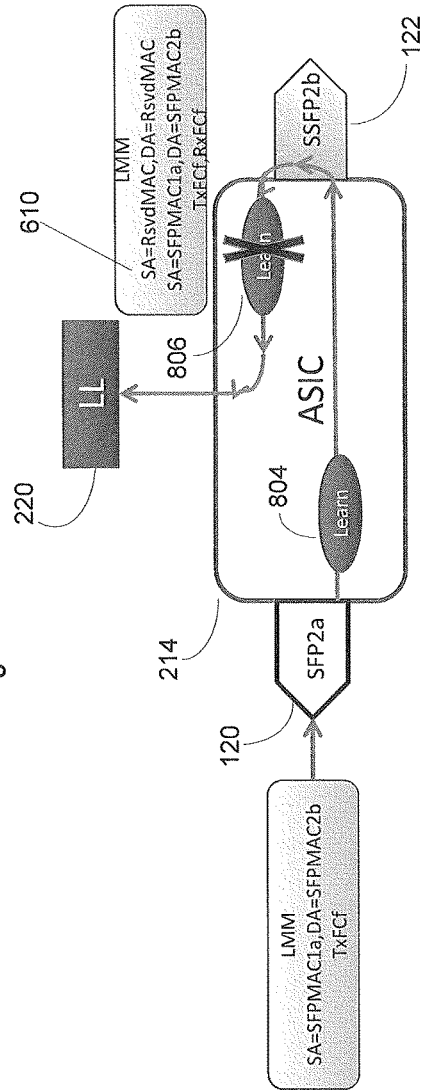
Figure 8A
Figure 8B

NETWORK PERFORMANCE DIAGNOSTICS SYSTEM

CROSS-REFERENCE TO RELATED APPLICATIONS

This application is a continuation of U.S. patent application Ser. No. 14/495,446, filed Sep. 24, 2014, which claims priority to U.S. Provisional Patent Application No. 61/926,711, filed Jan. 13, 2014, the entire contents of which are hereby incorporated by reference.

TECHNICAL FIELD

This disclosure relates to network performance analysis and/or network diagnostics such as delay measurement and/or loss measurement in packet based networks.

BACKGROUND

A Service Provider may provide a Service Level Agreement (SLA) to an end user that includes operational performance related parameters which should be met by the Service Provider. Network performance related fulfilling data may be provided on regular basis to end users in order to show that the Service Providers are able to meet the SLA parameters. ITU-T G.8013 Delay Measurement and Loss Measurement Functionality/Tools are being used to provide those parameters to end customers.

BRIEF DESCRIPTION OF THE FIGURES

The invention may be better understood with reference to the following drawings and description. The components in the figures are not necessarily to scale and the components illustrated are not intended to provide proportionality between respective features, emphasis instead being placed upon illustrating the principles of the invention.

FIGS. 8A and 8B are example packet communication path diagrams illustrating header configuration and routing of control protocol packets for loss measurement in a network device that includes communication interface devices.

DESCRIPTION OF EXAMPLE EMBODIMENTS

Overview

Figure 1:
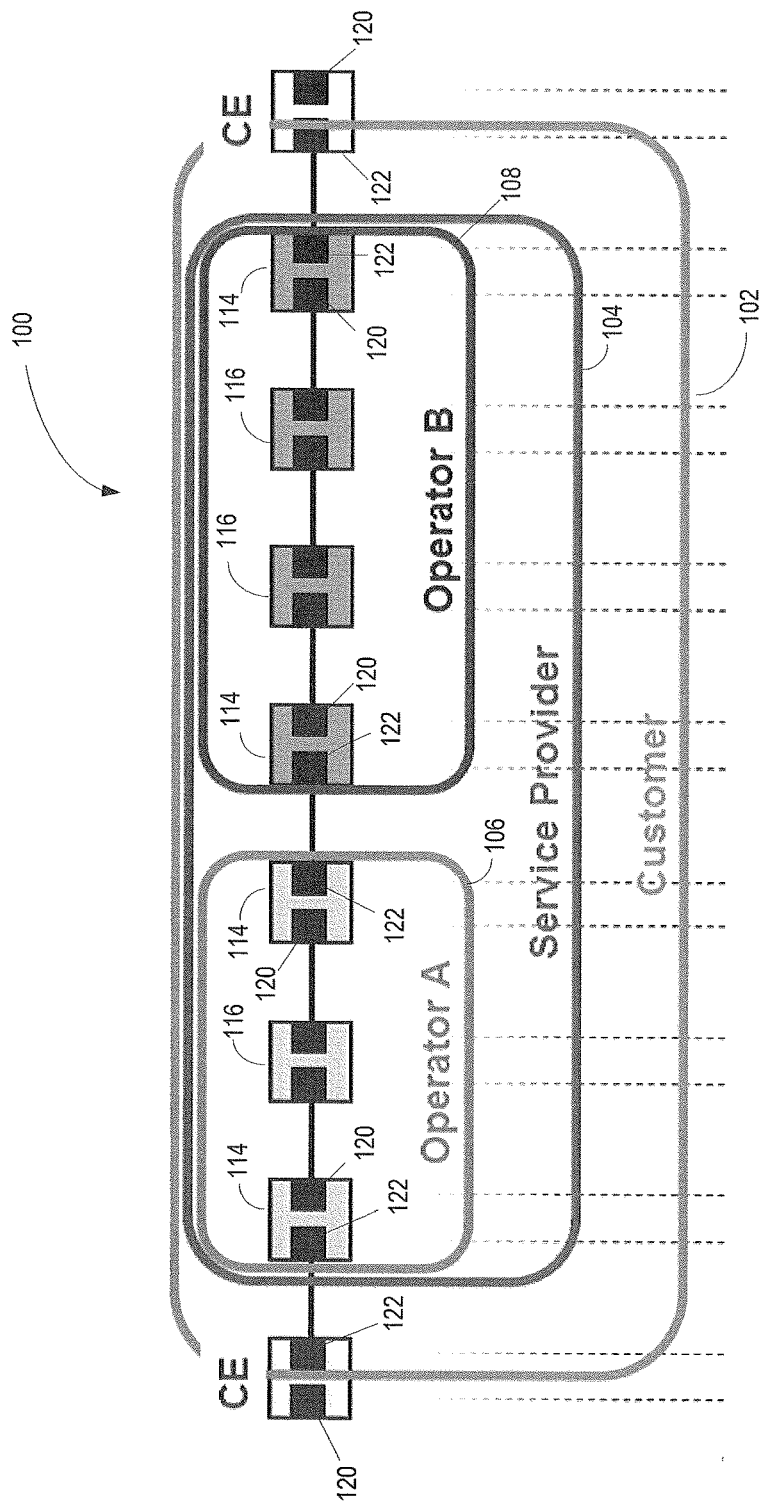
FIG. 1 is an example network that includes four maintenance domains and a network performance diagnostics system.

A network performance diagnostics system can generate with a network device, a control protocol packet used to perform fault management or performance monitoring, the control protocol packet including a source address of the network device, and a destination address. The source address included in the control protocol packet can be converted to an interface device address of a first communication interface device included in the network device. The control protocol packet can be forwarded to a second communication interface device included in the network device. The second communication interface device can transmit over a network the control protocol packet via the second communication interface device to the destination address.

The network performance diagnostics system performs a method of receiving, at a first communication interface device included in a network device, a control protocol packet used to perform fault management or performance monitoring. The control protocol packet can include a source address, and a destination address. The method can also include flooding the control protocol packet within the network device for receipt by a plurality of second communication interface devices included in the network device, and receiving the control protocol packet from only one of the plurality of second communication interface devices to which the destination address corresponds. The method can further include converting the destination address included in the control protocol packet to an address of the network device.

The network performance diagnostics system can include an apparatus having circuitry configured to generate a control protocol packet having a source address and a destination address, and circuitry configured to translate the source address to a first address of a first communication interface device. The first communication interface device is operable as a boundary interface. The apparatus can also include a second communication interface device, which is operable as an internal interface. The second communication interface device can be configured to transmit the control protocol packet over a network to the destination address.

Example Embodiments

Various embodiments described herein can be used alone or in combination with one another. The following detailed description describes only a few of the many possible implementations of the present embodiments. For this reason, this detailed description is intended by way of illustration, and not by way of limitation.

A network performance diagnostics system can perform operations, administration and maintenance (OAM) functions such as G.8013 delay and loss measurement without making hardware design changes to existing network devices, such as routers/switches. The network performance diagnostics system can include one or more diagnostic transceivers or communication interface devices, such as small form-factor pluggable devices (SFP) that provide integration methods for protocols for fault management or performance monitoring activities such as loss measurement (LM), delay measurement (DM), continuity/keepalive checking (CC), and loopback (LB). The diagnostic transceiver(s) or communication interface device(s) can include a processor, or other device capable of logic based functionality, or non-processor logic based device(s). The communication interface devices are hereinafter described as "SFP" or "SSFP" or "communication interface devices," however, it should be understood that the communication interface device(s) are not limited to small form-factor pluggable devices and instead can be any processor or non-processor based device(s) that can be included in, or can be in communication with, existing network devices, such as routers or switches. In some examples, communication interface devices can implement fault management or performance monitoring functionality, such as network operations, network administration, and network maintenance that can include continuity/keepalives, delay measurement, loss measurement and loop back functionality, as well as network fault management.

FIG. 1 is a block diagram of an example network that includes a network performance diagnostics system 100. The network performance diagnostics system 100 of this example embodiment may include a customer 102 defined by customer endpoints (CE), and a service provider 104. The service provider 104 may include subnetworks operated by a first operator A 106 and a second operator B 108. In this example, the customer, the service provider and the two operators each represent separate maintenance domains. In other example embodiments of the network performance diagnostics system 100, other configurations of maintenance domains are possible that can include any number of different or the same entities with any form of boundaries. In FIG. 1, the boundaries between the customer 102 and service provider 104, as well as the boundaries between operator A 106 and operator B 108 may be operationally, or contractually established boundaries. Within this example of the network performance diagnostics system 100, customer endpoints (CE) may include maintenance endpoints (MEP) that describe the boundaries of the customer's maintenance domain. The operator A 106 and operator B 108 may include network devices 114 containing interface devices 122 that include maintenance end points (MEP), and are positioned at the edges of respective maintenance domains of the operator A 106 and operator B 108 to identify their respective boundaries. In addition, the operator A 106 and operator B 108 may include network devices 116 containing interface devices that include maintenance intermediate points (MIP) which are positioned between the interface devices 122 that include MEPs. The MEPs may be used to support the detection of connectivity, performance and/or failures between any pair of network devices that include MEPs in the same maintenance domain. Thus, for example, connectivity between a MEP at one of the customer endpoints (CE) and a MEP at the other customer endpoint (CE) 110 may be detected since these MEPs are in the same maintenance domain. Network devices that include MIPs may support the discovery of paths among network devices that include MEPs, and may be used to locate faults along the discovered paths.

Each of the MEPs may operate within a network device, such as a switch device or a router device. The network device may include a plurality of communication ports. Each of the communication ports may include a communication interface device, which may be either a standard communication interface device (SFP) which simply forwards all packets between the network device and a wire, or an enhanced communication interface device (SSFP) which has additional capabilities such as identifying certain packets and processing them specially. Some communication interface devices may communicate as internal network-to-network interfaces (INNI) within a maintenance domain, such as within operator A 106, whereas other communication interface devices may communicate as user network interfaces (UNI) between a service provider and a customer or as external network-to-network interfaces (ENNI) between two maintenance domains. Communication interface devices that are internal to a maintenance domain may be referred to as internal communication interface devices 120, while communication interface devices at the boundary of a maintenance domain may be referred to as boundary communication interface devices 122, as illustrated in the example of FIG. 1. In either case, the communication interface devices may be standard communication interface devices or enhanced communication interface devices. A MEP may be instantiated on a boundary communication interface device 122. If a maintenance domain extends over a network device and includes the network attached to any internal communication devices 120, such a MEP may be considered to be an Up MEP. In FIG. 1, the service provider (SP) maintenance domain 104, Operator A maintenance domain 106 and Operator B maintenance domain 108 are examples of such maintenance domains.

Figure 2:
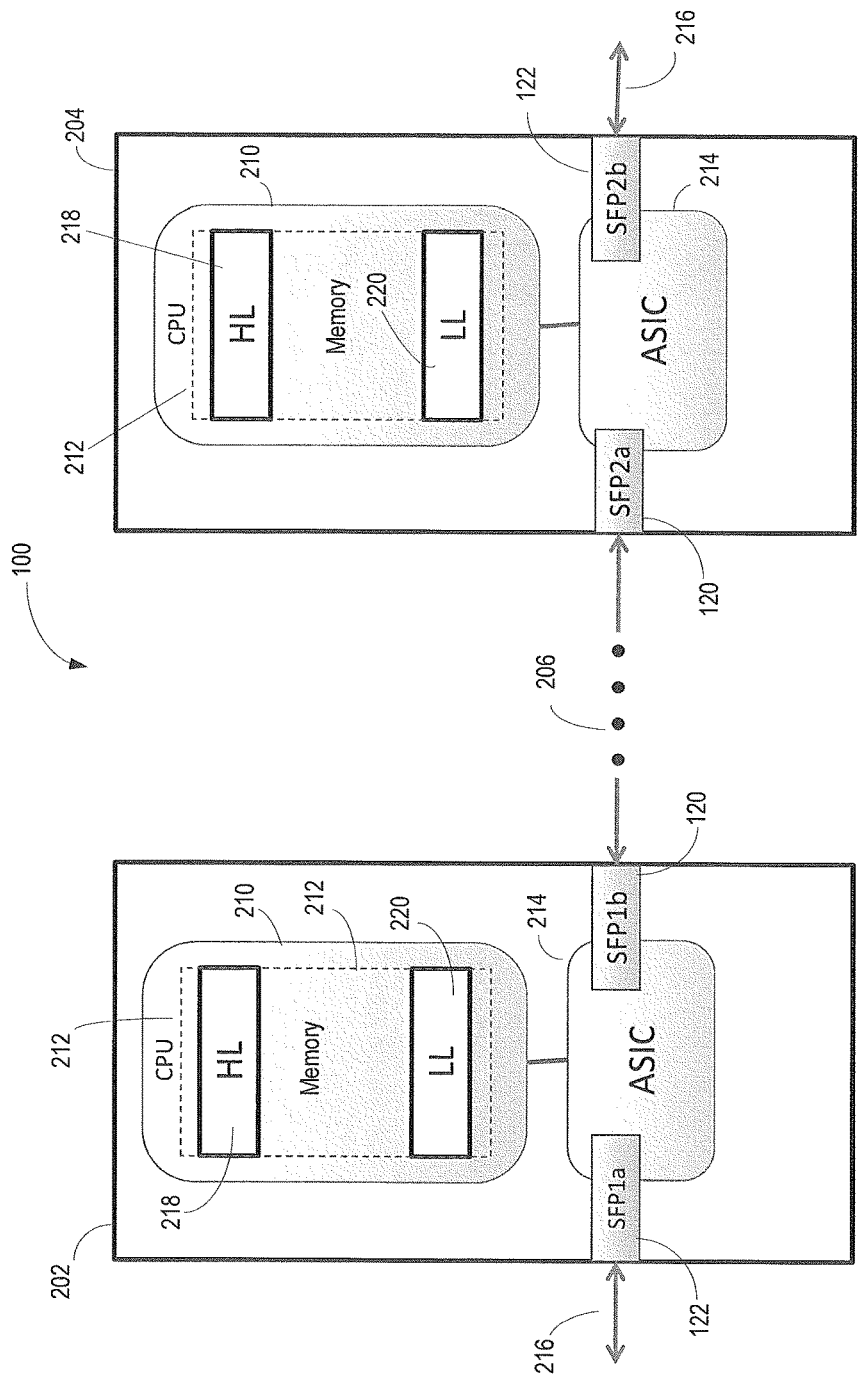
FIG. 2 is a block diagram of an example of part of the maintenance domain that includes network devices.

FIG. 2 is a block diagram of a portion of the network performance diagnostics system 100 that includes a first network device 202 in communication with a second network device 204 over a network 206. The first network device 202 and the second network device 204 may be a switch device, or a router device or any other device communicating on the network that includes circuitry which may include a processor (CPU) 210 and a memory 212. In addition, the first and second network devices 202 and 204 may include circuitry in the form of an application specific integrated circuit (ASIC) 214, such as a field programmable gate array (FPGA). The processor and the ASIC are referred to herein as the "electrical side." In other example embodiments, the functionality described may be performed by a processor and the integrated circuit may be omitted, or the functionality may be performed by an integrated circuit and the processor may be omitted. Also, each of the first and second network devices 202 and 204 may include a plurality of communication ports having a plurality of corresponding communication interface devices. The first and second network devices 202 and 204 may include a plurality of internal communication interface devices 120 that communicate as internal network-to-network interfaces (INNI) over the network 206 with other network devices in the same maintenance domain, and boundary communication interface devices 122 which may communicate as user network interfaces (UNI) or external network-to-network interfaces (ENNI) over a network 216 with other network devices in different maintenance domains. In the example of FIG. 2, the first and second network devices 202 and 204 are illustrated as positioned at the edges of a maintenance domain and therefore are illustrated as each including communication interface devices 120 that communicate as internal network-to-network interfaces (INNI) over the network 206, which are hereafter referred to as internal communication interface devices 120. In addition, the example first and second network devices 202 and 204 each include communication interface devices which may communicate as user network interfaces (UNI) or external network-to-network interfaces (ENNI) over the network 216, which are hereafter referred to as boundary communication interface devices 122. In an embodiment, such as in the example system of FIG. 1, the first and second network devices 202 and 204 may be equivalent to the network devices containing the maintenance endpoints (MEPs) included in operator A 106.

Referring again to FIG. 2, the first and second network devices 202 and 204 may include high-level circuitry (HL) 218 and low-level circuitry (LL) 220. The high-level circuitry 218 may include circuitry and software providing system level functionality of the network device. The low-level circuitry 220 may include circuitry and software providing functionality that is hardware specific, such as device drivers for the respective network device. The high-level circuitry 218 and the low-level circuitry 220 may cooperatively operate to perform the functionality of part of the network performance diagnostics system 100.

The processor 210 and the ASIC 214 may be in communication with the memory 212, the ASIC 214 and the communication interface devices 120 and 122. The memory 212 may store high-level information and data, such as an address database (DB) or other address storage mechanism that can be populated with unique addresses, such as MAC addresses of different components and devices within the network performance diagnostics system 100. The address database can be used by transmitting network devices to transmit control protocol packets to a destination using addresses from the database. The address database may be populated, for example by discovery using multicast messages, unicast messages and/or broadcast messages or any other discovery technique to determine, or learn, the unique addresses included in each of network devices, such as by MAC learning using source addresses (SA) or destination addresses (DA). In example embodiments, the database includes a remote MEP table that is populated from source addresses of received CC messages. Thus, addresses stored in the database can be learnt based on addresses in received packets; preconfigured, such as by user entry of information; and/or by any other mechanism or process to learn and populate the database with unique addresses of network devices. In addition, the memory 212 may include low-level information and data, such as an operating system of the particular network device. In addition, unique addresses, such as the MAC address(es) associated with a network device may be stored as low-level information and data.

In FIG. 2, for example, unique address(es) of the first and second network devices 202 and 204, such as a device MAC addresses of the first and second network devices 204, may be learnt. The address of the network devices 202 and 204 are referred to herein as "network device addresses." In addition, one or more unique addresses of each communication interface device of network device 204, such as MAC addresses, may be populated in the database, such as in an MEP table; these interface device addresses may be referred to as primary and secondary interface device addresses. In an embodiment, the network device address, such as a device-level MAC address of a destination network device may be used as a destination address to route a control protocol packet to the CPU 210 of the respective destination network device. In addition, a unique interface device address, such as a primary or a secondary interface device MAC address may be used as a destination address to route control protocol packets to a respective communication interface device. Although the term "MAC" is used to describe the unique addresses in the embodiments described, addressing is not limited to any particular protocol or format, and may be any addressing scheme resulting in unique addresses.

The internal communication interface devices 120 and the boundary communication interface devices 122 may be pluggable transceivers, which are each referred to as an SFP or an SSFP. The term pluggable refers to the capability of the communication interface devices 120 and 122 to be added and removed from a network device using a plugged connection. The communication interface devices 120 and 122 may include a processor and memory and/or other circuitry, which allow the communication interface devices 120 and 122 to perform computing using hardware in conjunction with software, such as software logic, to operate interactively and autonomously, and therefore operate as an enhanced communication interface device (SSFP) with additional capabilities to process received packets prior to transmission. Such processing capabilities may include analysis, modification and/or addition of data included in the received packets. Alternatively, the communication interface devices 120 and 122 may include circuitry absent a processor and memory, which can perform circuitry based logic, but not computing, and can be referred to as a standard communication interface device (SFP) which passes packets through. In an embodiment, both the internal communication interface devices 120 and the boundary communication interface devices 122 may be enhanced SFP devices. In another embodiment, the internal communication interface device 120 that is internal to the maintenance domain may be a standard SFP, and the boundary communication interface devices 122 at the boundary of the maintenance domain, on which a MEP may be instantiated, may be an enhanced SFP.

During operation, various unique addresses may be established and stored for use in communication of control protocol packets. Thus, in example embodiments MEPs at any of the internal communication interface devices 120 or the boundary communication interface devices 122 may be used to implement continuity/keepalive checks (CC), loss measurement (LM), delay measurement (DM), Link Trace (LT) and Loop Back (LB) functionality using the unique addresses. In an example embodiment, a MEP sending messages directly to a network out of the communication interface device on which it is instantiated can use a primary interface device address, such as the burnt in address of the communication interface device. A MEP sending messages into the network device from the communication interface device on which the MEP is instantiated, for example an Up MEP, can use the network device address, or it can use an interface device address in the form of a secondary interface device address, such as a device MAC Address of the communication interface device. In addition, or alternatively, such a MEP can also use the primary interface device address, such as the burnt in address of the communication interface device on which it is instantiated in the control protocol packets. Accordingly, in some embodiments, each communication interface device can be identified with only one address, and in other embodiments, each communication interface device can be identified with two addresses:

1. The primary interface device address, such as the burnt-in MAC address (BIA): This is a unique address of the communication interface device, such as a MAC address; and
2. The secondary interface device address: This unique address, such as a MAC address, can be used to associate control protocol packets with a particular communication interface device (SFP). The network device, such as a router, within which an SFP can operate should not learn the secondary interface device address, such as a MAC address to avoid MAC moves in the database, such as re-assignment of MAC addresses during operation, as discussed later.

As used herein, the term interface device address is used to describe a unique address of an interface device, which, in some embodiments, can be a primary interface device address or a secondary interface device address, whereas in other embodiments can be only one address. In embodiments where each communication interface device is associated with 2 addresses, the nomenclature "primary interface device address" and "secondary interface device address" is used to distinguish between interface addresses that can be learned by the ASIC 214 (primary interface device addresses), and interface device addresses that should not be learned by the ASIC 214 (secondary interface device addresses).

In an example operation, a control protocol packet may be generated using the high-level circuitry 218 with a source address (SA), such as a device address of the first network device 202, and a destination address (DA), such as a multicast or broadcast address, a device address of the second network device 204, or a primary or secondary address of a communication interface device hosted on the second network device 204. The control protocol packets may be used for diagnostic purposes in the network performance diagnostics system 100, such as continuity/keepalive checks (CC), loss measurement (LM), delay measurement (DM), Link Trace (LT) and Loop Back (LB). The control protocol packets may be received by the low-level circuitry 220, and the source address may be translated to a different address by the low-level circuitry 220. Following translation of the source address, the low-level circuitry 220, may route the control protocol packet to either the internal communication interface device 120 or the boundary communication interface device 122 included in the first network device 202. As described later, depending on where the control protocol packet is routed and the type of maintenance diagnostics being performed, additional operational parameters may be added to the control protocol packet.

The control protocol packet may then be routed via the internal communication interface device 120 over the network 206 for receipt by the internal communication interface devices 120 included in the second network device 204. As described later, depending on where the control protocol packet is routed in the second network device 204, and the type of maintenance diagnostics being performed, additional operational parameters may be added to the control protocol packet. In addition, in some example embodiments, an additional header may be added to the control protocol packet. Upon being routed to the low-level circuitry 220 included in the second network device 204, depending on the type of maintenance diagnostics being performed, the destination address (DA) may be translated, and/or the additional header (if present) may be removed. Upon being routed from the low-level circuitry 220 to the high-level circuitry 218, the control protocol packet may be processed accordingly.

In response to the message, depending on the type of maintenance diagnostics being performed, the second network device 204 may generate a response using the high-level circuitry 218. The response may be a control protocol packet that includes a source address (SA), such as a network device address MACR2 of the second network device 204, and a destination address (DA) such as a device address of the first network device 202, or a primary address, or a secondary address of the communication interface device 122 hosted in the first network device 202. The control protocol packet may be received by the low-level circuitry 220, and the source address may be translated to a different address by the low-level circuitry 220. Following the translation of the source address, the low-level circuitry 220, may route the connectivity management packet to either the internal communication interface device 120 or the boundary communication interface device 122 included in the second network device 204. As described later, depending on where the control protocol packet is routed and the type of maintenance diagnostics being performed, additional operational parameters may be added to the control protocol packet.

The control protocol packet which is the response may then be routed via the internal communication interface device 120 over the network 206 for receipt by the internal communication interface devices 120 included in the first network device 202. As described later, in example operations, the control protocol packet can be communicated from the internal communication interface device 120 to the boundary communication interface device 122 in the first network device 202. At the boundary communication interface device 122, depending on the type of maintenance diagnostics being performed, additional operational parameters may be added to the control protocol packet. In addition, in some example embodiments, an additional header may be added to the control protocol packet by the boundary communication interface device 122. The control protocol packet may then be communicated to the low-level circuitry 220 included in the first network device 202. Depending on the type of maintenance diagnostics being performed, the destination address (DA) may be translated to the unique address of the first network device 202, and/or the additional header (if present) may be removed. Upon being routed from the low-level circuitry 220 to the high-level circuitry 218, the control protocol packet may be recognized as a response and processed accordingly.

The selective translation of the unique addresses used as the source address (SA) can be performed to manage the learning of the unique addresses and flooding of a frame along the communication path of the control protocol packet. For example, in the case of translation of the source address from the network device address, such as a device address of the network device 202 or 204, to a unique secondary interface device address of the boundary communication interface device 122, the control protocol packet may be routed from the low-level circuitry 220 through the ASIC 214 to the boundary communication interface device 122, and then to the internal communication interface device 120 via the ASIC 214. In this example, the secondary interface device address of the boundary communication interface device 122 has been selected to ensure that the ASIC 214 has a fixed entry in the database for this address so that if a packet/frame is received with that address as the source address then learning does not happen in the ASIC 214 and if packet/frame is received with that address as the destination address then the frame is flooded to multiple communication interface devices. In an alternative embodiment that has only a single unique address for the boundary communication interface device 122, a fixed entry can instead be used with this address.

Figure 3:
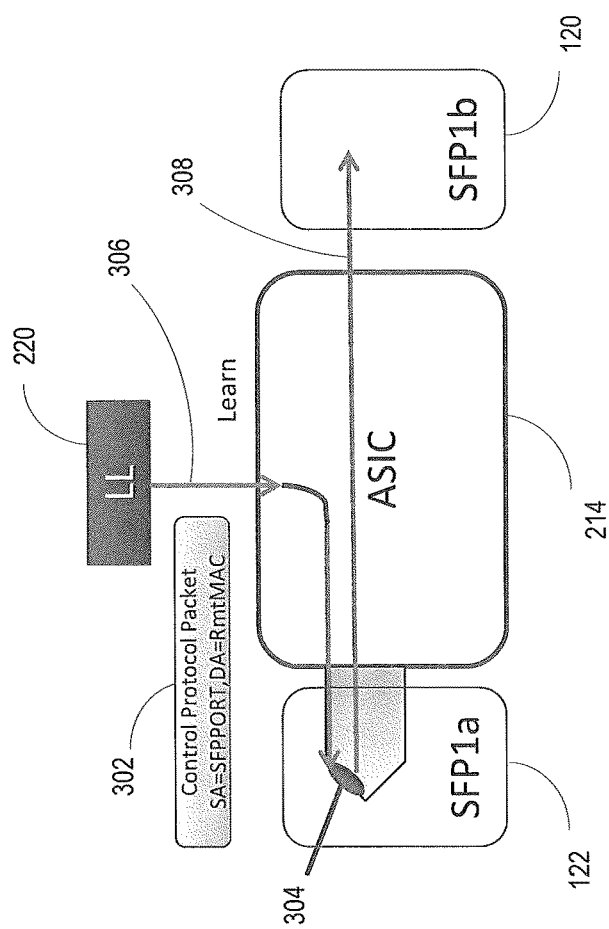
FIG. 3 is an example packet communication path flow diagram of a control protocol packet in a network device that includes communication interface devices.

FIG. 3 is an example block diagram illustrating the routing of a control protocol packet 302 from the low-level circuitry 220 of a network device to a logic circuit 304 included in the boundary communication interface device 122 of the network device along a first communication path 306 due to the packet 302 including a unique interface device address of the boundary interface device 122 with which the first logic circuit 304 is associated. In this example, following processing by the boundary communication interface device 122, the first control protocol packet 302 may be communicated via the ASIC 214 to the internal communication interface device 120 along a communication path 308. The interface device address of the boundary interface device 122 can be selected so that ASIC 214 does not learn this address as a source address (SA) even though the address may have been received from multiple sources. Thus, for example, if such an address is received as a destination address (DA) then the ASIC 214 can flood this packet to all the enhanced interface devices. To achieve flooding and non-learning of the interface device address in the ASIC 214, in an example embodiment, the interface address can be installed as an entry in the ASIC 214, which will prevent learning and allow flooding.

If the ASIC 214 learned the unique address of the boundary communication interface device 122 as a source address based on receipt of packets on both the first communication path 306 and the second communication path 308, the unique address of the boundary communication interface device 122 would be updated persistently in the database (for example, resulting in a MAC move) each time a packet containing the secondary interface device address was routed by the ASIC 214. In an example embodiment, in order for the ASIC 214 to not continually re-learn a unique secondary interface device address of the boundary communication interface device 122, the database may contain a fixed entry for the boundary communication interface device address. In an embodiment, the fixed entry does not include any particular location for the address. Accordingly, in this embodiment, the absence of a particular address location causes packets with the particular destination address to be flooded. In an alternative embodiment, the fixed entry could indicate that a boundary port is the origin of the address. In this case, all received packets with that address as the destination address (DA) can be directed to the boundary port, which could then add an extra header and resend the received packets back to the CPU, as described elsewhere. In either case, the fixed entry could refer to the single interface device address in embodiments where no secondary interface device address is needed. In yet another embodiment, the secondary address could be used as the source address when the packet is transmitted from the low-level circuitry 220 to the boundary communication interface device 122 along communication path 306, and the source address could be changed to the primary interface device address by the logic circuit 304 before the packet is transmitted to the internal communication interface device 120 along communication path 308. In this embodiment, the ASIC 214 receives the packet with a different source address for each communication path and can learn the locations accordingly.

Figure 4:
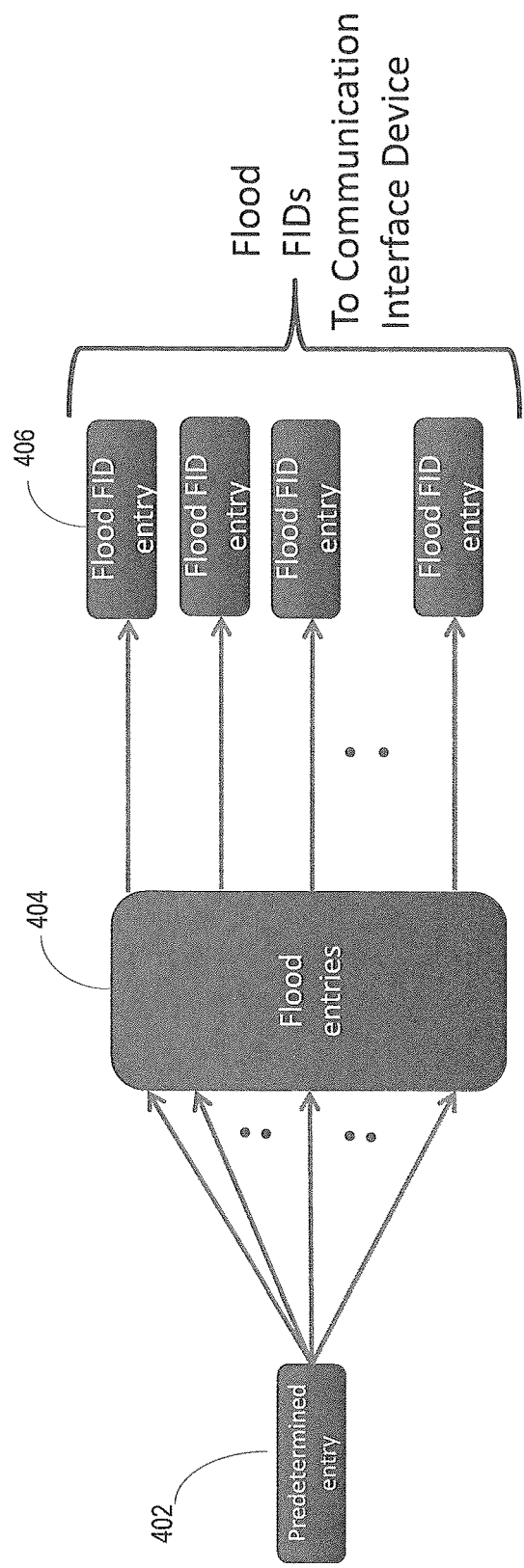
FIG. 4 is a block diagram illustrating an example of flooding a control protocol packet to communication interface devices.

FIG. 4 is an example block diagram illustrating flooding of a control protocol packet. In an example embodiment where the database includes a fixed entry for an interface device address of an interface device, the ASIC 214 is prevented from learning a unique location for this address when a control protocol packet containing the interface device address passes through the ASIC 214. Referring to FIGS. 2 and 4, upon receipt of a control protocol packet from over the network 206 at an internal communication interface device 120 of a network device 204, the ASIC 214 may use a predetermined fixed entry 402 in the database, as an identified match to a destination address (DA) included in the control protocol packet. For example, the destination address can be an interface device address of one of a plurality of boundary communication interface devices 122 included in the network device 204.

Upon receipt of the control protocol packet, and identification of the destination address as matching a fixed entry 402 in the database, the ASIC 214 can execute flood entries circuitry 404 that uses the predetermined entry 402 to create a plurality of flood entries (flood FID entries) 406. The flood entries 406 may be flooded to some or all the communication ports present in the network device 204. The communication ports drop the flooded frame if the destination address does not correspond with an interface device address of the respective communication interface device. Since the ASIC 214 identified the destination address in the control protocol packet as matching a fixed entry 402 in the database, the ASIC 214 is also enabled, based on this identification, to not learn a unique location for the destination address included in the control protocol packet. In other words, based on this predetermined entry 402 in the database, the circuitry of the ASIC 214 is also configured to prevent the learning of the source interface (physical or logical) for the control protocol packet that traverses the first route 306 and the second router 308 through the ASIC 214 as described with reference to FIG. 3.

Figure 5:
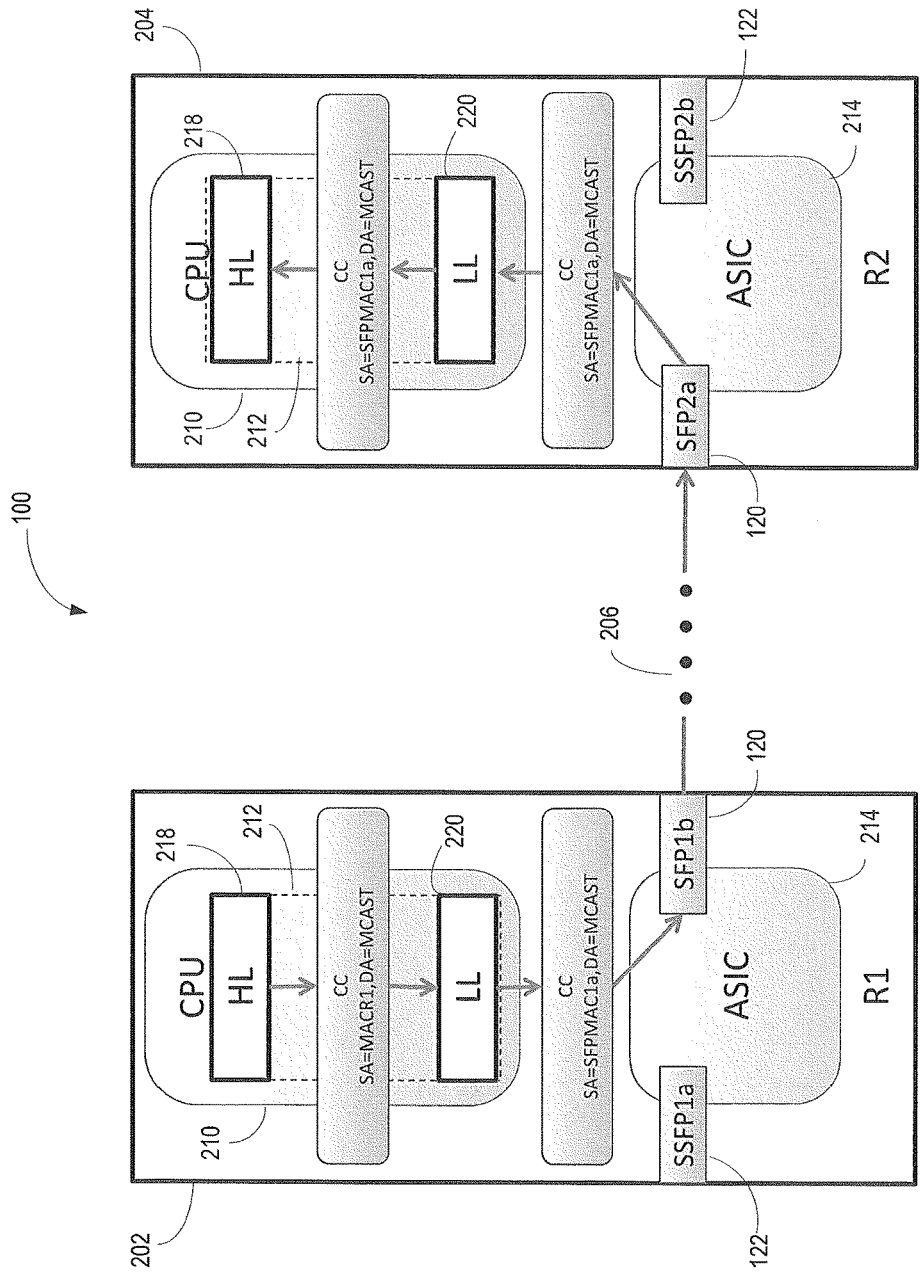
FIG. 5 is a block diagram of an example of part of the network performance diagnostics system performing continuity check diagnostics.

FIG. 5 is a block diagram to illustrate example operation of the network performance diagnostics system 100 to transmit a continuity/keepalive check (CC) message from the first network device 202 to the second network device 204 in the same maintenance domain along a packet path illustrated with arrows. In this example embodiment, the first network device 202 is a first router identified as R1, which initiates the CC message, and the second network device 204 is second router identified as an R2, which is the destination of the CC message. The CC message can be sent by a MEP instantiated on the boundary communication interface device 122 of the first network device 202 (for example an Up MEP) to a MEP instantiated on the boundary communication interface device 122 of the second network device 204 (for example an Up MEP). Both the first and second network devices 202 and 204 of this example include an enhanced communication interface device as the boundary communication interface device 122 (SSFP1a and SSFP2b) and a standard communication interface device as the internal communication interface device 120 (SFP1b and SFP2a). In this example, information, such as the MEP tables, which are stored in respective databases of the first and second network devices 202 and 204 have been populated with unique addresses such that the first network device 202 has stored as a destination address (DA), a unique address of the boundary communication interface device 122 (SSFP2b) of the second network device 204, and the second network device 204 has stored as a destination address (DA), the unique address of boundary communication interface device 122 (SSFP1a) of the first network device 202.

A continuity check (CC) message may be used for fault detection and notification by using a continuity check protocol to multicast "heart-beat" messages. The continuity check messages may be in the form of a control protocol packet that carries a status of a communication port upon which a maintenance endpoint (MEP) is configured. Continuity check messages may be uni-directional, such that there is no response from a receiver of the message, and may be transmitted at configurable periodic intervals by the MEPs in the network performance diagnostics system 100.

As illustrated in FIG. 5, a continuity check (CC) message may be generated using the high-level circuitry 218 with a source address (SA) being the network device address of the network device, such as a MAC address MACR1 of a first router device, and a destination address (DA), such as a multicast address of MCAST. The CC message may be received by the low-level circuitry 220, and the source address may be translated to a unique interface device address of the boundary communication interface device 122 (SSFP1a), such as SFPMAC1a, by the low-level circuitry 220. The source address is translated to an interface device address in a manner which prevents the learning of this address as the source address, so if a packet is later received with this destination address then it is flooded in the ASIC 214 due to being matched to an installed fixed entry in the database of ASIC 214.

Following the translation of the source address, the low-level circuitry 220, may route the control protocol packet to the internal communication interface device 120 (SFP1b) via the ASIC 214. Since the MEP is instantiated on the boundary communication interface device 122, the source address is an address identifying the boundary communication interface device 122. The control protocol packet is routed by the ASIC 214 to the internal communication interface device 120 since there are no additions or modifications to a CC message prior to transmission over the network 206. In other examples, as discussed later, the control protocol packet may be routed via the boundary communication interface device 122 in order to add or modify the data in the packet. The control protocol packet may then be communicated via the internal communication interface device 120 (SFP1b) over the network 206 for receipt by the internal communication interface devices 120 (SFP2a) included in the second network device 204. The CC message may then be routed by the internal communication interface device 120 (SFP2a) in the second network device 204 without modification to the ASIC 214. The ASIC 214 can flood this packet due to the destination address being a multicast address. The flooding can include the ASIC 214 sending this packet to the low-level circuitry 220 included in the second network device 204. In an alternative embodiment, one or more of a plurality of other communication interface devices in the second network device 204 may receive the packet from the ASIC 214 and send it to the low-level circuitry 220. Upon being routed from the low-level circuitry 220 to the high-level circuitry 218, the control protocol packet may be recognized and processed accordingly. In an alternative embodiment, the first and second network devices 202 and 204 may both include enhanced communication interface devices as both the boundary communication interface device 122 (SSFP1a and SSFP2b) and the internal communication interface device 120 (SSFP1b and SSFP2a). In this example embodiment, operation is similar to that which was previously discussed.

Figure 6:
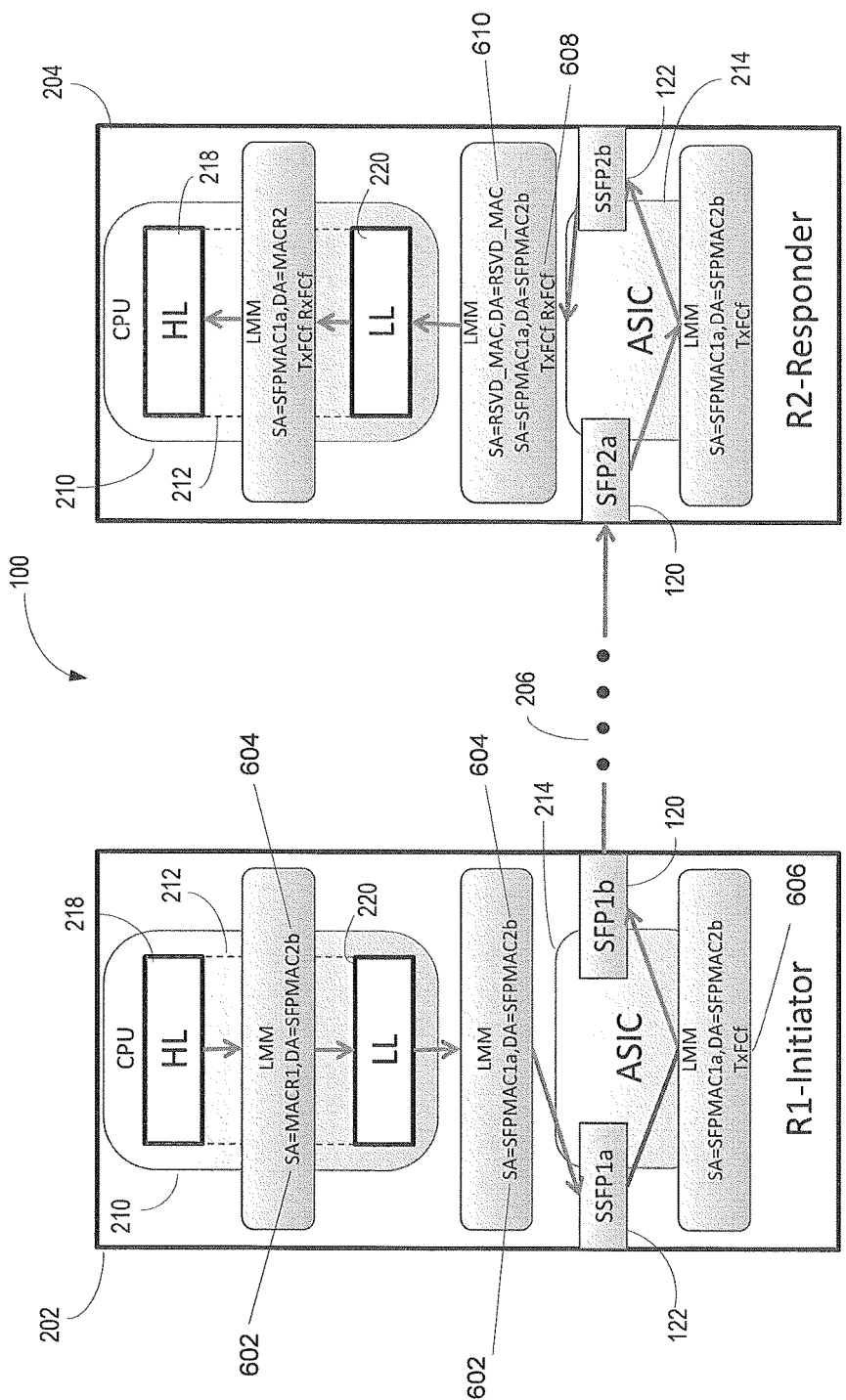
FIG. 6 is a block diagram of an example of part of the network performance diagnostics system communicating a loss measurement message.

FIG. 6 is a block diagram of example operation of the network performance diagnostics system 100 to transmit a loss measurement (LM) message from the first network device 202 to the second network device 204 in the same maintenance domain as illustrated with arrows. In this example embodiment, the first network device 202 is a first router identified as R1-Initiator of the LM message, and the second network device 204 is second router identified as an R2-Responder, and the LM message is sent by a MEP instantiated on the boundary communication interface device 122 of the first network device 202 (for example an Up MEP) to a MEP instantiated on the boundary communication interface device 122 of the second network device 204 (for example an Up MEP). Both the first and second network devices 202 and 204 of this example embodiment include a enhanced communication interface device as the boundary communication interface device 122 (SSFP1a and SSFP2b) and a standard communication interface device as the internal communication interface device 120 (SFP1b and SFP2a). In this example, the tables stored in respective databases (DB) in the first and second network devices 202 and 204 have been populated with unique addresses such that the first network device 202 has stored as a fixed address a unique interface device address (SFPMAC1a) of the boundary communication interface device 122 (SSFP1a) of the first network device 202, which may be used as a source address (SA) to avoid a MAC move by the ASIC 214 in the first network device 202. In addition, the second network device 204 has stored as a fixed address a unique interface device address (SFPMAC2b) of boundary communication interface device 122 (SSFP2b) of the second network device 204, which may be used as a destination address (DA) by the first network device 202 after being learnt as a part of the MEP learning on the first network device 202. Also, the first network device 202 may use as a source address (SA) a unique network device address (MACR1), which is not exposed outside of the first network device 202, and the second network device 204 may use as a source address (SA) a unique network device address (MACR2), which is not exposed outside of the network device 204.

A loss measurement protocol may be used for detecting packet loss and isolating where the packet losses are occurring. In the example of FIG. 6, a loss measurement message (LMM) may be generated with the first network device 202 using the high-level circuitry 218 with a header having a source address (SA) 602 of the network device address, such as a MAC address MACR1 of the first router device 202, and a destination address (DA) 604 of the boundary communication interface device 122 (SFP2b), such as SFPMAC2b included in the second network device 204. In this example, the address (SFPMAC2b) is the address that R1 will have seen as the source address of any control packets (such as. CC messages) previously received from the MEP on SFP2b. Thus, in this example, the address (SFPMAC2b) is described as being the destination address for the LMM. In other examples, such as where R2 was not using any enhanced SFPs, the destination address might be different, such as being MACR2. The LM message may be received by the low-level circuitry 220, and the source address 602 may be translated to a unique address of the boundary communication interface device 122 (SSFP1a), such as SFPMAC1a, by the low-level circuitry 220. Following the translation of the source address, the low-level circuitry 220, may route the control protocol packet via the ASIC 214 to the boundary communication interface device 122 (SSFP1*a*) in the first network device 202. The boundary communication interface device 122 (SSFP1*a*) can identify the source address and accept the packet. After accepting the packet, the boundary communication interface device 122 (SSFP1*a*) may add operational parameters 606, such as packet loss measurement information, to the packet, and forward the LM message to the ASIC 214. The operational parameters 606, such as packet loss information may, for example, include transmit counter data (TxFCf). The ASIC 214 may pass through the LM message to the internal communication interface device 120 (SFP1*b*), which transmits the LM message over the network 206 for receipt by the internal communication interface devices 120 (SFP2*a*) included in the second network device 204.

Figure 7:
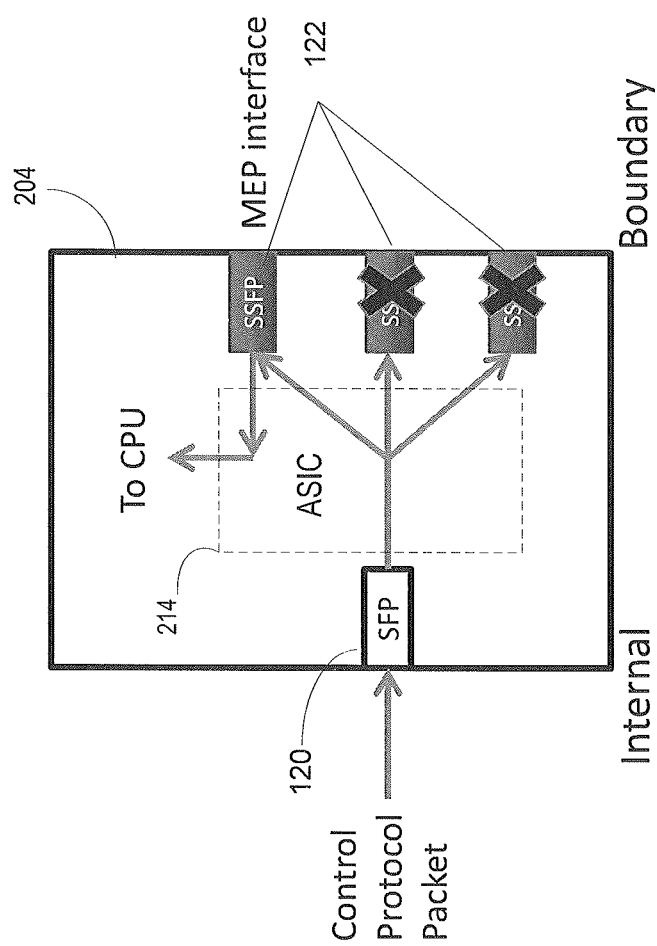
FIG. 7 is a block diagram illustrating an example of flooding a control protocol packet to boundary communication interface devices.

The LM message (LMM) received with SFPMAC2*b* as destination address on communication interface device 120 at the second network device 204 may then be flooded by the ASIC 214. The LM message may be flooded since the ASIC 214 has not learned the unique address of the boundary communication interface device 120 (SSFP2*b*) due to the destination address of the LM message matching the fixed entry in the ASIC 214 for that address. FIG. 7 is a block diagram illustrating flooding of the LMM to multiple boundary communication interface devices 122 on the second network device 204. The destination address in the LM message is an interface device address of one of the boundary communication interface devices 122, and the ASIC 214 has not learned the unique interface device addresses of any of the boundary communication interface devices 122. Thus, the destination address (DA), such as SFPMAC2*b*, is unknown to the ASIC 214. Accordingly, the internal communication interface device 120 transmits the LM message as a pass through by the ASIC 214 to a plurality of the boundary communication interface devices 122 present in the second network device 204. Those boundary communication interface devices 122 that do not recognize the unique interface device address included as the destination address (DA) will drop the LM message packet as indicated by "x" in FIG. 7. However, the boundary communication interface device 122 with the interface device address SFPMAC2*b* will accept the packet.

Referring again to FIG. 6, upon receiving and accepting the flooded LM message packet due to the match with the destination address (DA), the boundary communication interface device 122 (SSFP2*b*) may add operational parameters 608, such as packet loss information, to the LM message packet. In an example embodiment, the packet loss information may include statistics, such as receive counter data (RxFCf) of the second network device 204. The boundary communication interface device 122 (SSFP2*b*) may also add an additional header 610, such as an Ethernet header, to the LM message packet. The additional header may be a second header that includes a different source address (SA1) and destination address (DA1) from the source address (SA) and the destination address (DA) included in the existing first header. In FIG. 6, the source address (SA1) and destination address (DA1) included in the additional second header may be respective unique addresses dedicated to the second network device (RSVD_MAC). The addresses in the second header can be any reserved addresses in the network device, such as different MAC addresses RSVD_MAC. The destination address in the second header is recognized by the ASIC 214 so that the ASIC 214 routes the header to the low-level circuitry 220. Thus, in an example embodiment, the destination address in the second header may be the network device address, such as MACR2, of the second network device 204, however, in other embodiments, any address, flag or symbol that is recognized by the ASIC 214 as an indicator to forward the LM message packet to the low-level circuitry 220 can be used. The second header may also include a message identifier that can be used to classify the frame as an LM message packet. The LM message packet may then be transmitted through the ASIC 214 (pass through) to the low-level circuitry 220 without any MAC moves occurring.

The second header is added to the LM message packet so that the ASIC 214 of the second network device 204 does not relearn the location of the unique source address in the packet as coming from the boundary communication interface device 122 (SSFP2*b*), and instead maintains the location of the source address in the packet as coming from the internal communication interface device (SFP2*a*). In other words, the addition of the second header avoids the ASIC 214 of the second network device re-learning the source address in the LM message, which is an interface device address of the boundary communication interface device 122 in the first network device 202. This avoids MAC moves of unique source addresses on the second network device 204.

FIG. 8*a* is a block diagram illustrating a first embodiment of an example first LM message communication path 802 and second LM message communication path 803 in a portion of the second network device 204 of FIG. 6. In FIG. 8*a*, no additional header (second header) is added to the LM message packet, accordingly, when the LM message packet passes through the ASIC 214 from the internal communication interface device 120 (SFP2*a*), the ASIC 214 learns the location of the unique address (RmtMAC) included as the source address (SA) at a block 804. Once the boundary communication interface device 122 (SSFP2*b*) receives and adds/modifies LM specific information in the control protocol packet, when the LM message packet is again passed through the ASIC 214 to the low-level circuitry 220, the ASIC learns a different location for the source address (RmtMAC) address at a block 806 as coming from the boundary communication interface device 122 (SSFP2*b*). Thus, in an example embodiment where the unique addresses learned by the ASIC 214 are MAC addresses, the ASIC may make a MAC move 810 to replace the location of the MAC address (RmtMAC) learned at block 804 with the location learned at block 806 each time an LM message packet is communicated along the communication path 802.

FIG. 8*b* is a block diagram illustrating a second embodiment of an example LM packet communication path 802 in a portion of the second network device 204 of FIG. 6. In FIG. 8*b*, an second header is added to the LM message packet, accordingly, when the LM message packet passes through the ASIC 214 from the internal communication interface device 120 (SFP2*a*), the ASIC 214 learns the location of the unique network device address (SFPMAC1*a*) included as the source address (SA) at a block 804. In this embodiment, when the boundary communication interface device 122 (SSFP2*b*) receives the LM message packet, a second header is added that includes a reserved source and destination address. Due to the addition of the second header, when the LM message packet is again passed through the ASIC 214 to the low-level circuitry 220, the ASIC 214 does not learn a different location for the unique source address SFPMAC1*a*, since the additional second header includes the reserved addresses, and block 806 can be omitted as indicated in FIG. 8B with an "x". Thus, in an example embodiment where the unique addresses learned by the ASIC 214 are MAC addresses, the ASIC avoids making MAC Moves each time an LM message packet is communicated along the communication path 802.

Referring again to FIG. 6, upon the LM message packet being received by the low-level circuitry 220 of the second network device 204, the second header 610 may be stripped off In addition, the destination address (DA) may be changed from the interface device address (SFPMAC2b) to the unique network device address of the second network device, such as a MAC address (MACR2). The LM message packet may then be provided to the high-level circuitry 218 for loss measurement related processing, such as looking for dropped packets, using at least the operational parameters 606 and 608 added by the boundary communication interface devices 122 (SSFP1a and SSFP2b).

Figure 9:
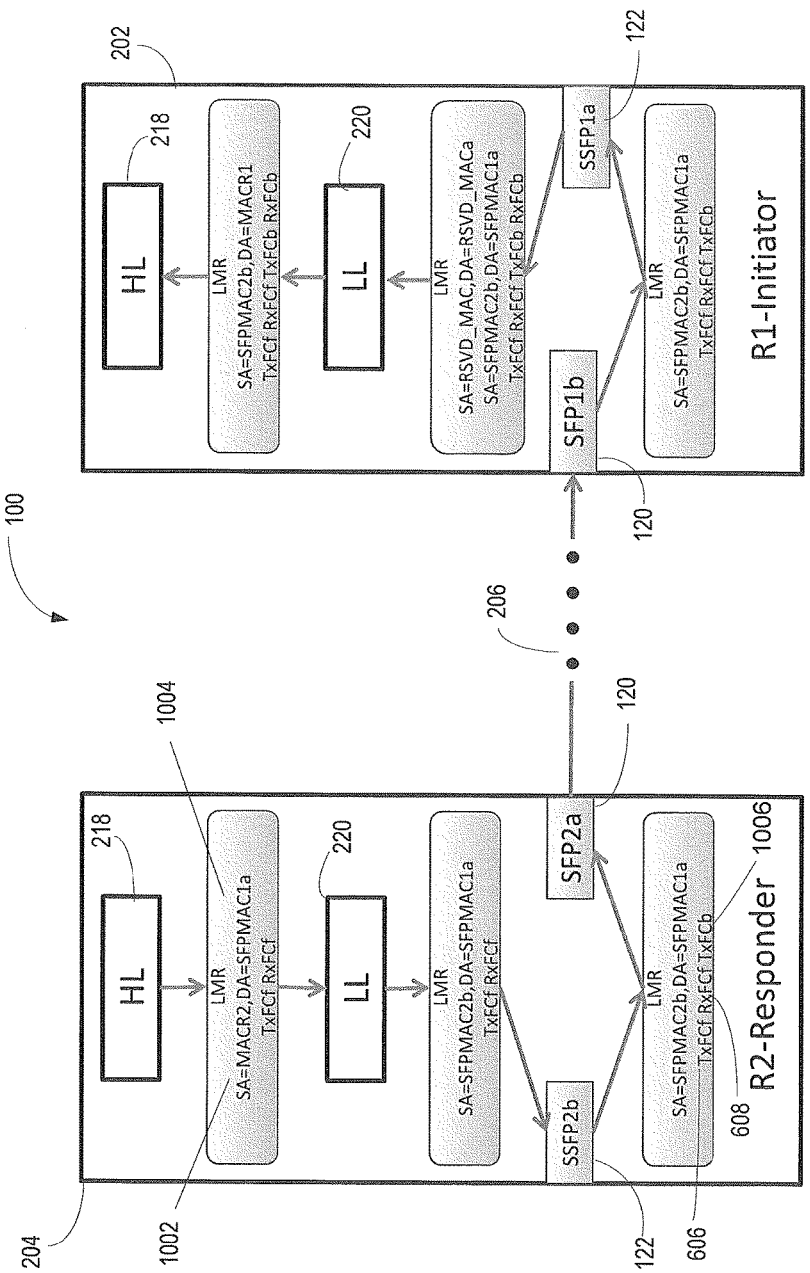
FIG. 9 is a block diagram of an example of part of the network performance diagnostics system communicating a loss measurement response.

FIG. 9 is a block diagram of example operation of the network performance diagnostics system 100 to transmit a loss measurement (LM) response (LMR) from the second network device 204 (R2 responder) to the first network device 202 (R1 initiator). The LM response may be generated by the high-level circuitry 218 of the second network device 204, in response to receipt of the LM message discussed with reference to FIGS. 6-8. For purposes of brevity, the previously described features and functionality will not be repeated since the flow is similar to that previously described in many respects. In FIG. 9, along the packet path as indicated by arrows, portions of the network devices, such as the CPU and ASIC have been omitted for clarity.

In this example embodiment, the LM response may be generated as a message using the high-level circuitry 218 of the second network device 204 with a source address (SA) 1002 which is the network device address of the second network device 204, such as a MAC address (MACR2). In addition, the LM response may include a destination address (DA) 1004 which is, in this example, an interface device address of the boundary communication interface device 122 (SSFP1a), such as SFPMAC1a. This address is used as the destination address in the LM response since the LM message to which the LM response is responding included this address as the source address. The LM response may be received by the low-level circuitry 220, and the source address may be translated to an interface device address of the boundary communication interface device 122 (SSFP2b), such as SFPMAC2b by the low-level circuitry to avoid MAC moves by the ASIC 214, as previously discussed. Accordingly, in an example embodiment, the database of the second network device 204 may include a fixed entry for the boundary communication interface device 122 in the second network device 204. Following the translation of the source address, the low-level circuitry 220, may route the LM response packet to the boundary communication interface device 122 (SSFP2b) of the second network device 204.

The boundary communication interface device 122 (SSFP2b) can identify the source address and accept the packet. After accepting the packet, the boundary communication interface device 122 (SSFP2b) may add operational parameters 1006, such as packet loss measurement information, to the operational parameters 606 and 608 included in the packet, and forward the LM response to the ASIC 214. The packet loss information 1006 may, for example, include transmit counter data (TxFCb) of the second network device 204. The ASIC 214, without learning a new location of any address, may pass through the LM response to the internal communication interface device 120 (SFP2a), which transmits the LM response over the network 206 for receipt by the internal communication interface devices 120 (SFP1b) included in the first network device 202. Upon receipt of the LM response, the first network device 202 may operate similarly to the second network device 204, as discussed with reference to FIGS. 6-8, upon receipt of the LM message to flood the control protocol packet, add the second header, and convert the secondary interface device address (SFPMAC1a) to the network device address (MACR1).

Figure 10:
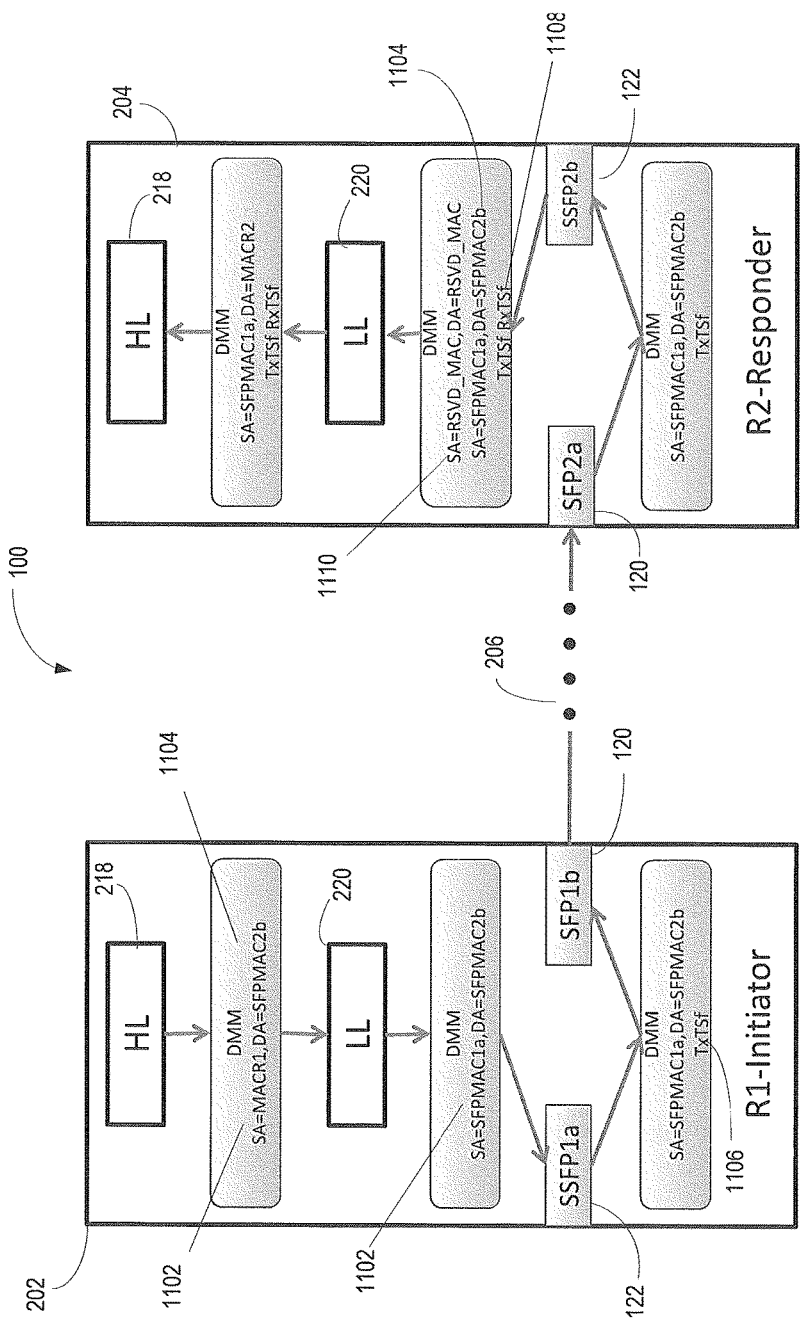
FIG. 10 is a block diagram of an example of part of the network performance diagnostics system communicating a delay measurement message.

FIG. 10 is a block diagram of example operation of the network performance diagnostics system 100 to transmit a delay measurement (DM) message from the first network device 202 to the second network device 204 in the same maintenance domain. The DM message may be used to determine delay between network devices by transmitting a DMM packet from a first network device, to a second network device. The second network device may respond with a delay measurement response (DMR) message to further determine the delay in both directions between network devices. In FIG. 10, along the packet path as indicated by arrows, portions of the network devices, such as the CPU and ASIC have been omitted for clarity.

In this example embodiment, the first network device 202 is identified as R1-Initiator of the DM message, and the second network device 204 is identified as an R2-Responder. Both the first and second network devices 202 and 204 of this example embodiment include an enhanced communication interface device as the boundary communication interface device 122 (SSFP1a and SSFP2b) and a standard communication interface device as the internal communication interface device 120 (SFP1b and SFP2a). In this example, the tables stored in respective databases in the first and second network devices 202 and 204 have been populated with learnt addresses as previously described.

Similar to the previous examples of Loss Measurement (LM) message communication, the DM message (DMM) may be generated with the high-level circuitry 218 to include a source address (SA) 1102 of the first network device 202, such as a MAC address (MACR1) of the first network device 202, and a destination address (DA) 1104 of an interface address of the boundary communication interface device 122 (SSFP2b) of the second network device 204, such as SFPMAC2b. In this embodiment, the source address (SA) 1102 of the DMM packet may be converted to a unique interface device address, such as SFPMAC1a, of the boundary communication interface device 122 (SSFP1a) of the first network device 202, and then routed to the boundary communication interface device 122 (SSFP1a) via the ASIC 214 without the ASIC learning a new location of the source address (SA). In an embodiment, a source address of the interface device address is not learned by the ASIC 214 because the address of the boundary interface device 122 is stored in a fixed entry of a database included in the first network device 202. The boundary communication interface device 122 (SSFP1a), may add operational parameters 1106, such as timestamps (TxTSf) for use in delay measurement, and forward the DM message via the ASIC 214, without the ASIC 214 learning the source address. The DM message may be routed by the ASIC 214 to the internal communication interface device 120 (SFP1b), which transmits the DMM packet over the network 206 for receipt by the internal communication interface devices 120 (SFP2a) included in the second network device 204.

Upon receipt of the DM message, the second network device 204 may operate similarly to receipt of an LM message to flood the DM message to a plurality of boundary communication interface devices 122 resident in the second network device 204. In response to the flooded message, one of the boundary interface devices 122 which corresponds to the destination address (SFPMAC2b) may receive the DM message, and add a second header 1110, as discussed with reference to FIGS. 6-8. Since the second header has been added to the control protocol packet, the ASIC 214 does not perform a MAC move even though the control protocol packet containing the interface address device address is received from two different sources by the ASIC 214, since the ASIC 214 does not see the first header the second time the control protocol packet is received. In the example of a DM message, the boundary communication interface device 122 (SSFP2b) of the second network device 202 can add different operational information (RxTSf) 1108 such as time stamps to the DM message. In addition, similar to the LM message, the low-level logic 220 of the second network device 204 can translate the destination address (DA) 1104 in the first header to the unique network device address of the second network device 204, such as from the interface device address SFPMAC2b, to the network device address, such as a MAC address MACR2 of the second network device 204.

Figure 11:
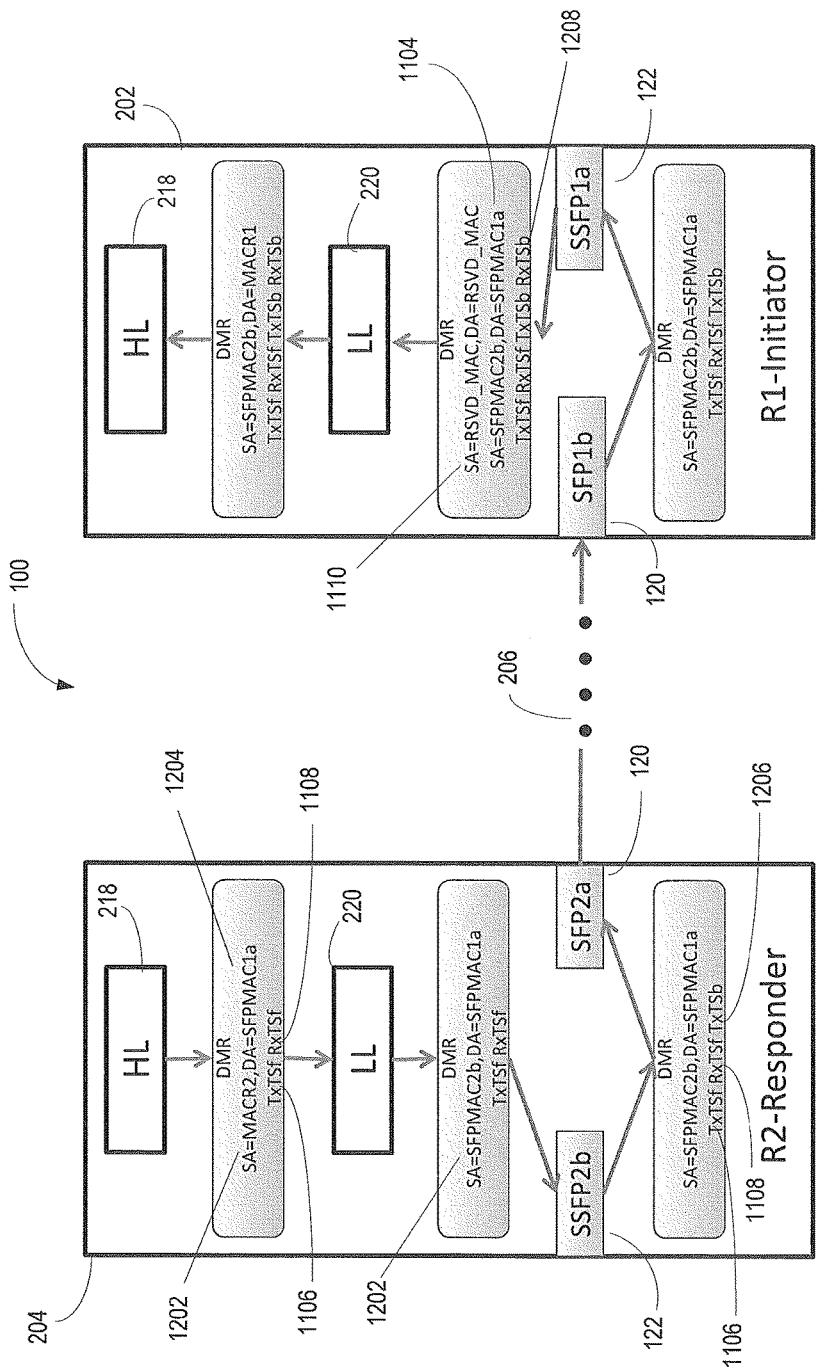
FIG. 11 is a block diagram of an example of part of the network performance diagnostics system communicating a delay measurement response.

FIG. 11 is a block diagram of example operation of the network performance diagnostics system 100 to transmit a delay measurement (DM) response from the second network device 204 to the first network device 202. The DM response may be generated by the high-level circuitry 218 of the second network device 204, in response to receipt of the DM message discussed with reference to FIG. 10, which is similar in at least some aspects to the functionality associated with the LM response message discussed with reference to FIG. 9. For purposes of brevity, the previously described features and functionality will not be repeated. In FIG. 11, along the packet path as indicated by arrows, portions of the network devices, such as the CPU and ASIC have been omitted for clarity.

In this example embodiment, the DM response (DMR) packet may be generated as a message using the high-level circuitry 218 of the second network device 204 with a source address (SA) 1202 which is a network device address of the second network device 204, such as a MAC address of MACR2, and a destination address (DA) 1204 of an interface device address of the boundary communication interface device 122 (SFP2b), such as SFPMAC1a, that was received as the source address in the DM message to which this is a response. The DM response may include the operational parameters 1106 and 1108 from the DM message. The DMR packet may be received by the low-level circuitry 220, and the source address may be translated to an interface device address of the boundary communication interface device 122 (SSFP2b), such as SFPMAC2b, by the low-level circuitry 220 so the ASIC 214 does not learn the address, as previously discussed. Following translation of the source address, the low-level circuitry 220, may route the DM response packet to the boundary communication interface device 122 (SSFP2b) of the second network device 204.

After accepting the packet, the boundary communication interface device 122 (SSFP2b) may add operational parameters 1206, such as delay measurement information, to the operational parameters 1106 and 1108 included in the packet, and forward the DM response to the ASIC 214. The delay measurement information 1206 may, for example, include transmit timestamps (TxTSb) of the second network device 204. The ASIC 214 may pass through the DM response to the internal communication interface device 120 (SFP2a) without learning the source address. The internal communication interface device 120 (SFP2a) transmits the DM response over the network 206 for receipt by the internal communication interface devices 120 (SFP1b) included in the first network device 202. Upon receipt of the DM response, the first network device 202 may operate similarly to the second network device 204, as discussed with reference to FIG. 10 upon receipt of the DM message to flood the DM response, add the second header, and convert the interface device address in the first header to the network device address of the first network device 202. In addition, the boundary communication interface device 122 (SSFP1a) may add operational parameters 1208, such as a receive timestamp (RxTSb), to the already present operational parameters 1106, 1108, 1206.

Figure 12:
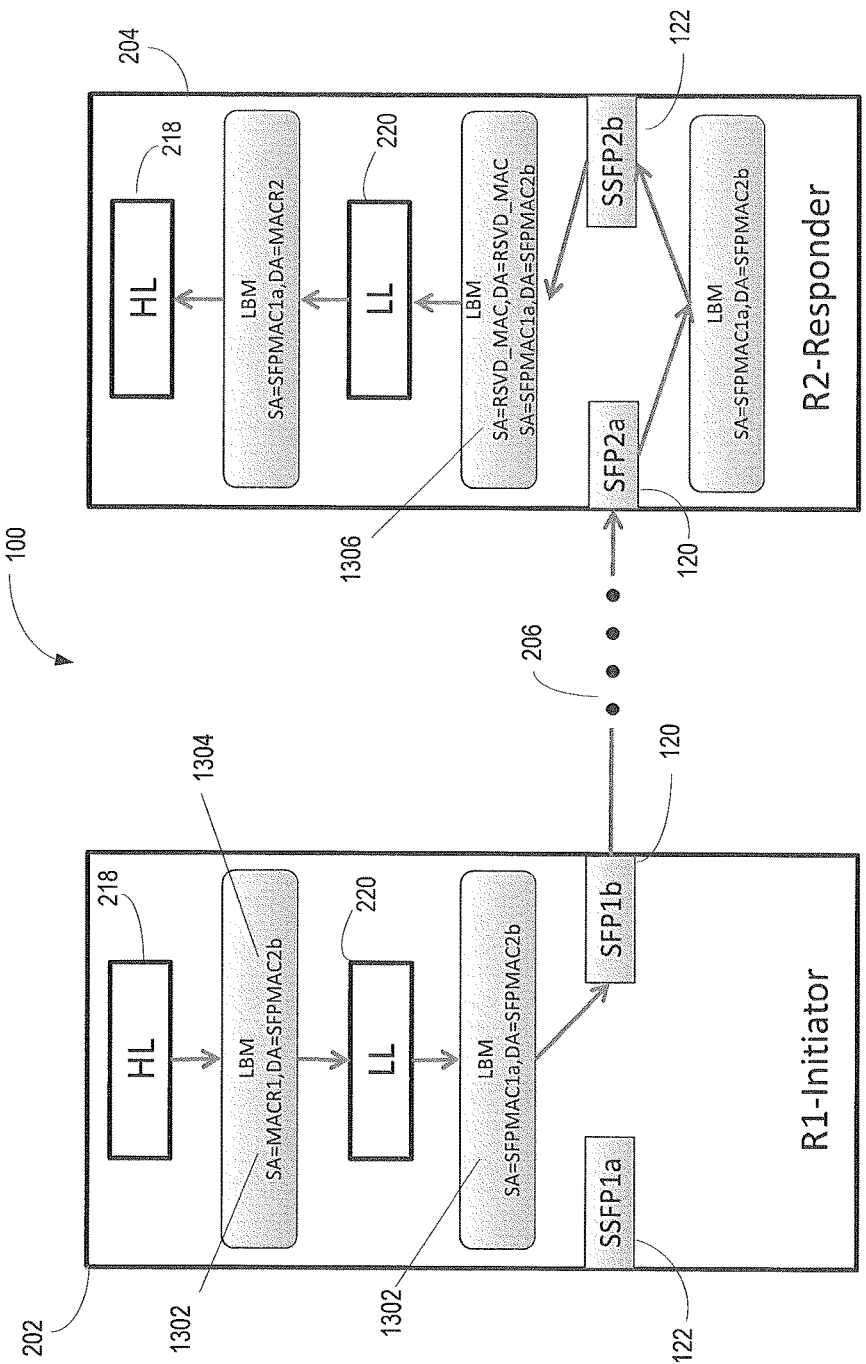
FIG. 12 is a block diagram of an example of part of the network performance diagnostics system communicating a loop back message.

FIG. 12 is a block diagram of example operation of the network performance diagnostics system 100 to transmit a loopback (LB) message from the first network device 202 to the second network device 204, which is similar in configuration and functionality in at least some respects to the embodiment of FIGS. 5 and 10 and the previously discussed CC and LMM messaging, accordingly, for purposes of brevity, the discussion will not be repeated. A loopback protocol from which the LBM packet is generated may be used for fault verification. Using the loopback protocol, a network device, such as a maintenance endpoint (MEP) can transmit a unicast LBM packet to another network device, such as another MEP or to a maintenance intermediate point (MW) in the same maintenance area (MA). The network device to which the LBM packet is transmitted may respond by transforming the LBM packet into a unicast loopback response (LBR) packet, which can be sent back to the network device that originated the LBM packet. In an embodiment, a network device may also transmit a multicast LBM, to which network devices, such as those containing MEPs in the same maintenance area (MA), may respond.

Similar to the generation of the CC message of FIG. 5, in the example of FIG. 12, the LB message (LBM) packet may be generated with the high-level circuitry 218 to include a source address (SA) 1302 which is a network device address of the first network device 202, such as a MAC address (MACR1), and a destination address (DA) 1304 of an interface device address of the boundary communication interface device 122 (SSFP2b), such as SFPMAC2b. The source address (SA) 1302 of the LBM packet may be converted to a unique network device address (SFPMAC1a) of the boundary communication interface device 122 (SSFP1a) of the first network device 202 by the low-level circuitry 220 so that ASIC 214 does not learn this address when received with source address and floods when received as destination address. In this embodiment, the LBM packet is routed via the ASIC 214 to the internal communication interface device 120 (SFP1b), instead of to the boundary communication interface device 122 (SSFP1a) as in the example of a DMM message. Routing to the internal communication interface device 120 (SFP1b), instead of to the boundary communication interface device 122 (SSFP1a) is performed by the low-level circuitry 220 based on, for example, the low-level circuitry identifying the control protocol packet as an LB message. Identification by the low-level circuitry may be based on a flag, an identifier, analysis of the payload of the packet, or any other mechanism to identify the packet as an LB message. Since the MEP is instantiated on the boundary communication interface device 122 (SSFP1a), the interface device address (SFPMAC1a) is used as the source address in the LB message. To avoid MAC moves by the ASIC 214, the interface device address (SFPMAC1a) is stored as a fixed address in a database of the first network router 202. Accordingly, similar to the previous examples, the ASIC 214 does not learn a new location of the interface device address (SFPMAC1*a*) due to the fixed address entry in a location in the database. In FIG. 12, along the packet path as indicated by arrows, portions of the network devices, such as the CPU and ASIC have been omitted for clarity.

Following the translation of the source address, the low-level circuitry 220, may route the LBM packet via the ASIC 214 to the internal communication interface device 120 (SFP1*b*), which transmits the LBM packet over the network 206 for receipt by the internal communication interface devices 120 (SFP2*a*) included in the second network device 204. Upon receipt of the LBM packet, the second network device 204 may operate similarly to the second network device 204 of FIG. 10 to add a second header 1306, as discussed with reference to FIG. 10, except that the boundary communication interface device 122 (SSFP2*b*) of the second network device 204 does not add any operational information to the LB message frame. In addition, the low-level logic 220 of the second network device 204 can translate the destination address (DA) 1304 to the unique address of the second network device 204, such as from an interface device address (SFPMAC2*b*), to the network device address of the second network device 204, such as a MAC address MACR2.

Figure 13:
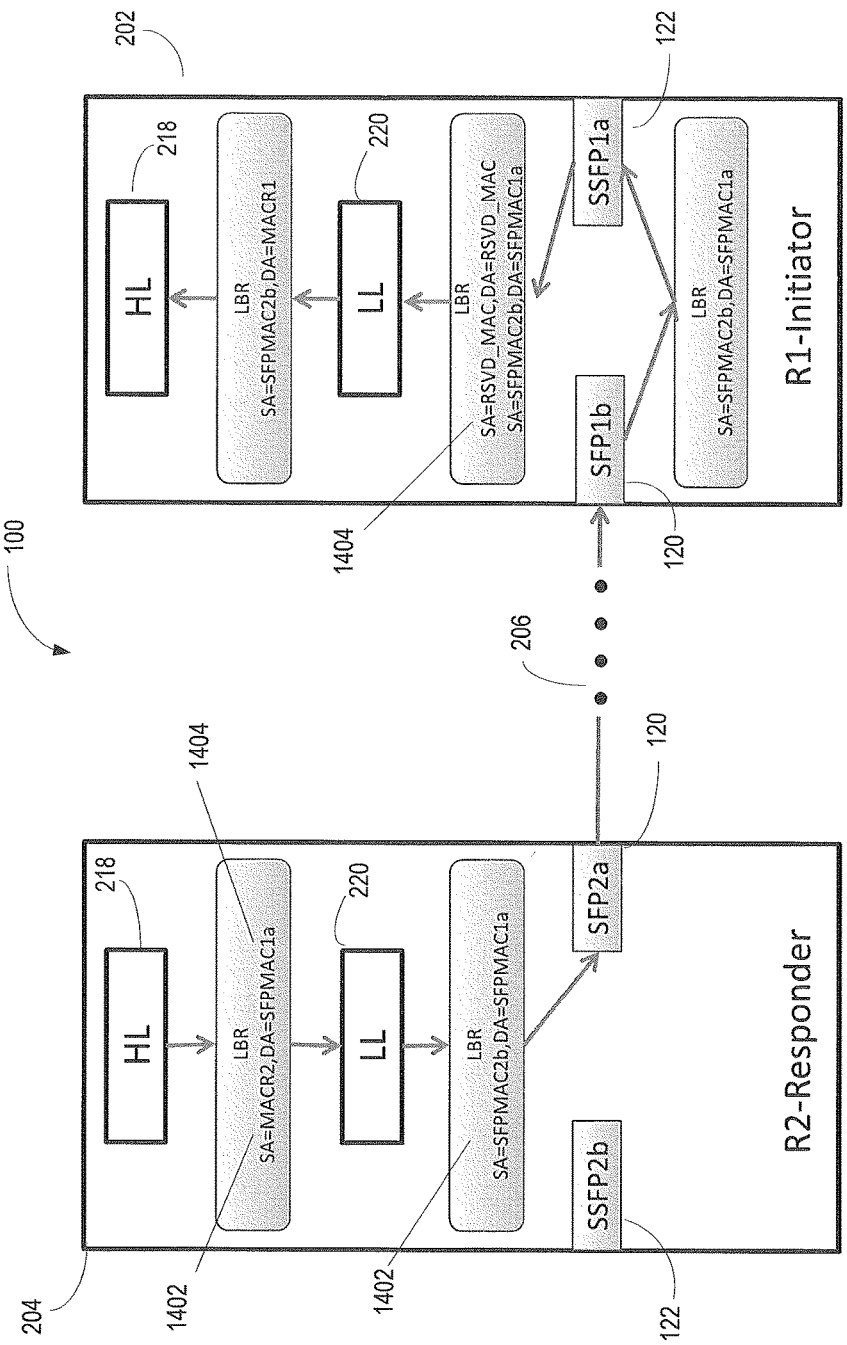
FIG. 13 is a block diagram of an example of part of the network performance diagnostics system communicating a loop back response.

FIG. 13 is a block diagram of example operation of the network performance diagnostics system 100 to transmit a loopback (LB) response as a response from the second network device 204 to the first network device 202. The LB response (LBR) may be generated by the high-level circuitry 218 of the second network device 204, in response to receipt of the LB message discussed with reference to FIG. 12, which is similar in at least some respects to the DM response message discussed with reference to FIG. 11. For purposes of brevity, the previously described features and functionality will not be repeated. In FIG. 13, along the packet path as indicated by arrows, portions of the network devices, such as the CPU and ASIC have been omitted for clarity.

In this example embodiment, the LB response (LBR) packet may be generated as a message using the high-level circuitry 218 of the second network device 204 with a source address (SA) 1402 which is the network device address of the network device, such as a MAC address (MACR2), and a destination address (DA) 1404 of the interface device address of the boundary communication interface device 122 (SFP1*a*), such as SFPMAC1*a*, that was included as the source address in the LB message to which this is a response. The LBR packet may be received by the low-level circuitry 220, and the source address may be translated by the low-level circuitry 220 to an interface device address of the boundary communication interface device 122 (SSFP2*b*), such as SFPMAC2*b*. Following the translation of the source address, the low-level circuitry 220, may route the LB response packet to the internal communication interface device 120 (SFP2*a*) via the ASIC 214 of the second network device 204 without the ASIC 214 learning the address of the boundary communication interface device 122, as previously discussed with reference to FIG. 12. The internal communication interface device 120 (SFP1*b*) can transmit the LB response over the network 206 for receipt by the internal communication interface devices 120 (SFP1*b*) included in the first network device 202. Upon receipt of the LB response, the first network device 202 may operate similarly to the second network device 204 discussed with reference to FIG. 12 to flood the packet, add a second header 1404 and change the destination address (DA) in the first header to the unique network device address, such as MACR1, as discussed with reference to FIG. 9, except the boundary communication interface device 122 (SSFP1*a*) of this embodiment does not add operational parameters to the LBR packet, since no such operational parameters are needed in an LBR.

Figure 14:
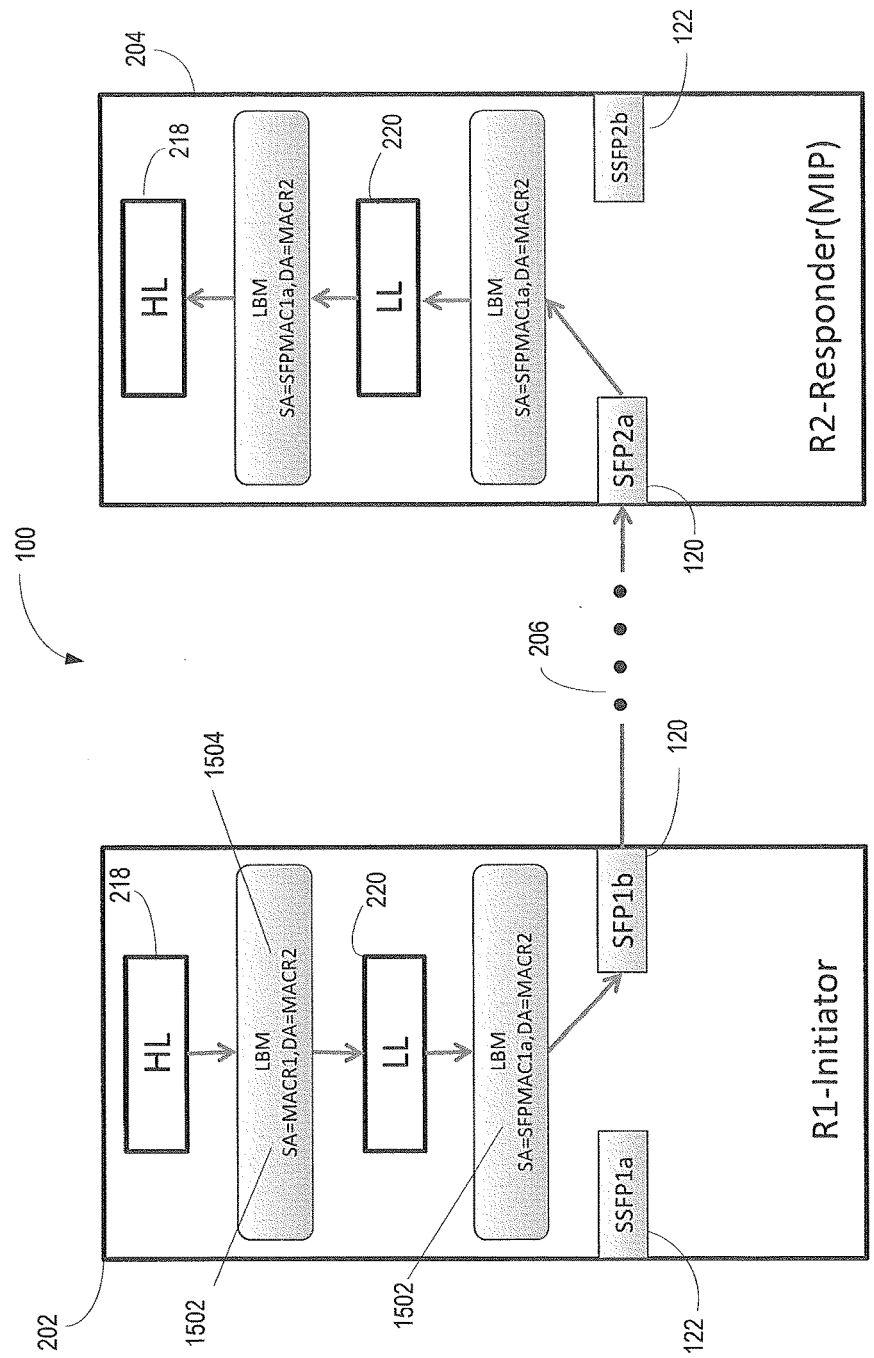
FIG. 14 is a block diagram of an example of part of the network performance diagnostics system communicating a loop back message to a maintenance intermediate point.

FIG. 14 is a block diagram of example operation of the network performance diagnostics system 100 to transmit a loopback (LB) message from the first network device 202 (R1 initiator) to the second network device 204 (R2 responder). The LB message can be sent by a MEP instantiated on the boundary communication interface device 122 of the first network device 202 (for example an Up MEP) to a maintenance intermediate point (MW) on the second network device 204, in the same maintenance domain as the MEP in the first network device 202. In FIG. 14, along the packet path as indicated by arrows, portions of the network devices, such as the CPU and ASIC have been omitted for clarity.

The LB message (LBM) packet may be generated with the high-level circuitry 218 to include a source address (SA) 1502 which is a network device address of the first network device 202, such as a MAC address (MACR1), and a destination address (DA) 1504 of the unique network device address of the second network device 204, such as a MAC address (MACR2). The source address (SA) 1502 of the LBM packet may be converted to a unique address of the boundary communication interface device 122 (SSFP1*a*) of the first network device 202 by the low-level circuitry 220 so the ASIC 214 does not learn the address if packet is received as source address as this address and flooded if received as destination address as this address. Similar to the embodiment described in conjunction with FIG. 12, the LBM packet is routed via the ASIC 214 to the internal communication interface device 120 (SFP1*b*) of the first network device 202, without the ASIC 214 learning the address of the boundary communication interface device 122.

The unique address of the boundary communication interface device 122 (SSFP1*a*) to which the source address is translated by the low-level circuitry 220 may be a unique address of the boundary communication interface device 122 (SSFP1*a*), such as SFPMAC1*a*. Following the translation of the source address, the low-level circuitry 220, may route the LBM packet to the internal communication interface device 120 (SFP1*b*) based on the low-level circuitry 220 identifying the control protocol packet as a LBM packet using previously discussed packet identification techniques. The internal communication interface device 120 (SFP1*b*) can transmit the LBM packet over the network 206 for receipt by the internal communication interface devices 120 (SFP2*a*) included in the second network device 204, which contains an MIP. Upon receipt of the LBM packet, the second network device 204 routes the LBM packet to the low-level circuitry 220 due to the destination address (DA) being the unique address of the second network device 204. The LBM packet may then be passed to the high-level circuitry 218 for further processing.

Figure 15:
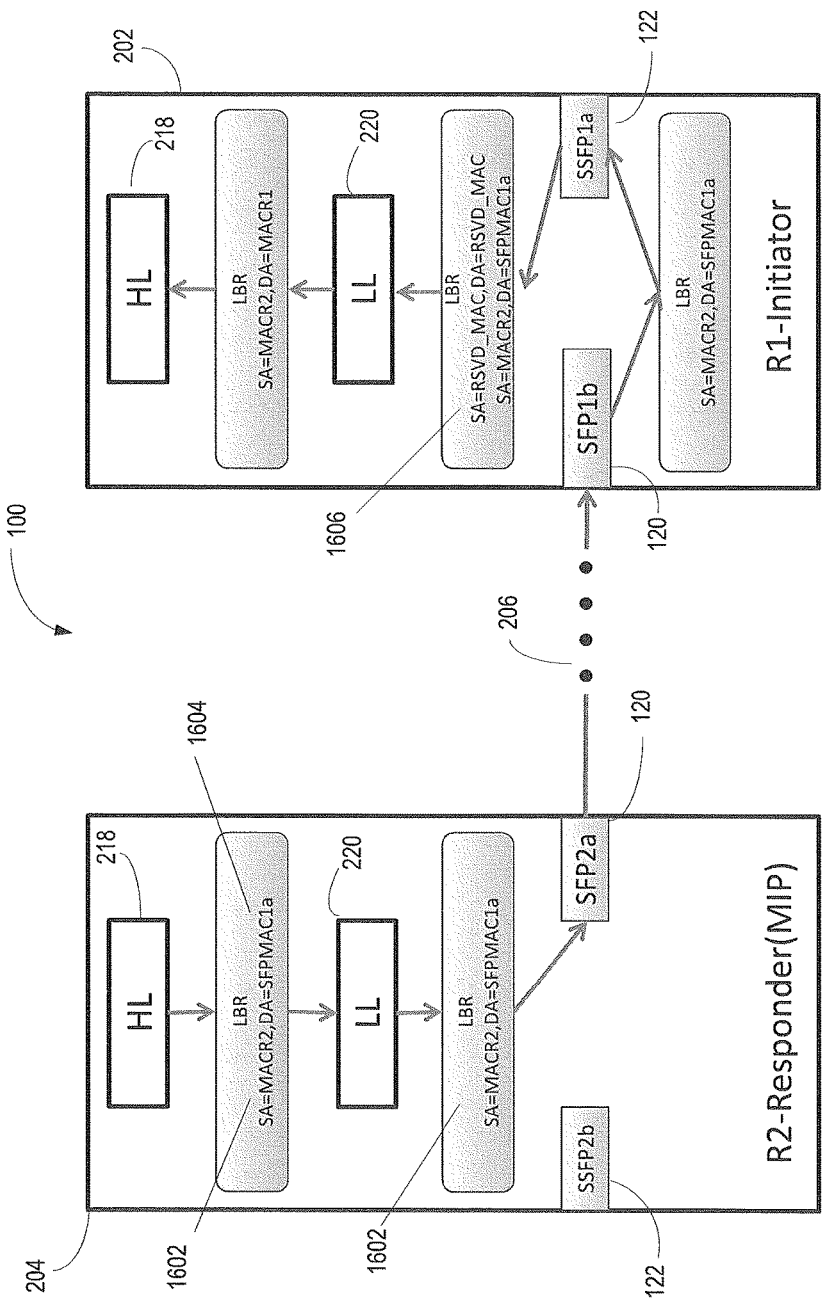
FIG. 15 is a block diagram of an example of part of the network performance diagnostics system communicating a loop back response from a maintenance intermediate point.

FIG. 15 is an example block diagram of operation of the network performance diagnostics system 100 to transmit a loopback (LB) response from a MIP contained in the second network device 204 (R2 responder) to a MEP instantiated on the boundary communication interface device (122) of the first network device 202 (R1 initiator). The LB response may be generated by the high-level circuitry 218 of the second network device 204, in response to receipt of the LB message discussed with reference to FIG. 14. In FIG. 15, along the packet path as indicated by arrows, portions of the network devices, such as the CPU and ASIC have been omitted for clarity.

In this example embodiment, the LB response (LBR) packet may be generated using the high-level circuitry 218 of the second network device 204 with a source address (SA) 1602 which is a network device address of the second network device 204, such as a MAC address (MACR2), and a destination address (DA) 1604 of the unique secondary interface device address of the boundary communication interface device 122 (SFP1*a*) in the first network device 202, such as SFPMAC1*a*, that was received as the source address in the LB message to which this is a response.

The LBR packet may be received by the low-level circuitry 220, and, in this embodiment, the source address may be maintained as unchanged even though there is a boundary communication interface device 122 (SSFP2*b*) included in the second network device 204, because the packet is being transmitted from a MIP. The low-level circuitry 220 may route the LB response packet to the internal communication interface device 120 (SFP2*a*) via the ASIC 214 of the second network device 204. The internal communication interface device 120 (SFP2*a*) can transmit the LB response over the network 206 for receipt by the internal communication interface devices 120 (SFP1*b*) included in the first network device 202.

Similar to the LBR packet described with reference to FIG. 13, the LBR packet may then be flooded from the internal communication interface devices 120 (SFP1*b*) since the first network device 202 has installed a fixed entry for SFPMAC1*a* address for flooding the packet in ASIC 214. As previously discussed with reference to FIG. 7, the LBR packet may be passed through the ASIC 214 and be flooded to multiple boundary communication interface device 122 (SSFP1*a*) on the first network device 202. Those ports that receive the LBR packet but do not recognize the unique address included as the destination address (DA) will drop the LBR packet. However, the port with the unique address (SFPMAC1*a*) will accept the packet.

Upon receiving and accepting the LBR packet due to the match with the destination address (DA), the boundary communication interface device 122 (SSFP1*a*) may add an additional header 1606, such as an Ethernet header, to the LB response. The additional header may be added so that the ASIC 214 does not relearn the address of the second network device (MACR2), as previously discussed. The additional second header may be a second header that includes a source address (SA1) and a destination address (DA1) different from the source address (SA) and the destination address (DA) included in the existing first header, as previously discussed. In FIG. 15, the source address (SA1) included in the additional second header may be a unique address dedicated to the first network device 202, such as a MAC address RSVD_MAC. The second header may also be used to classify the frame as an LBR packet. The LBR packet may then be transmitted through the ASIC 214 (pass through) to the low-level circuitry 220 in the first network device 202. Upon the LBR packet being received by the low-level circuitry 220, the second header may be stripped off In addition, the destination address (DA) may be change to the unique address of the first network device 202, such as a MAC address (MACR1). The LBR packet may then be provided to the high-level circuitry 218 for further processing. Such further processing may include analyzing whether any previous LBRs have been lost or calculating the round trip time since the corresponding LBM was transmitted.

Figure 16:
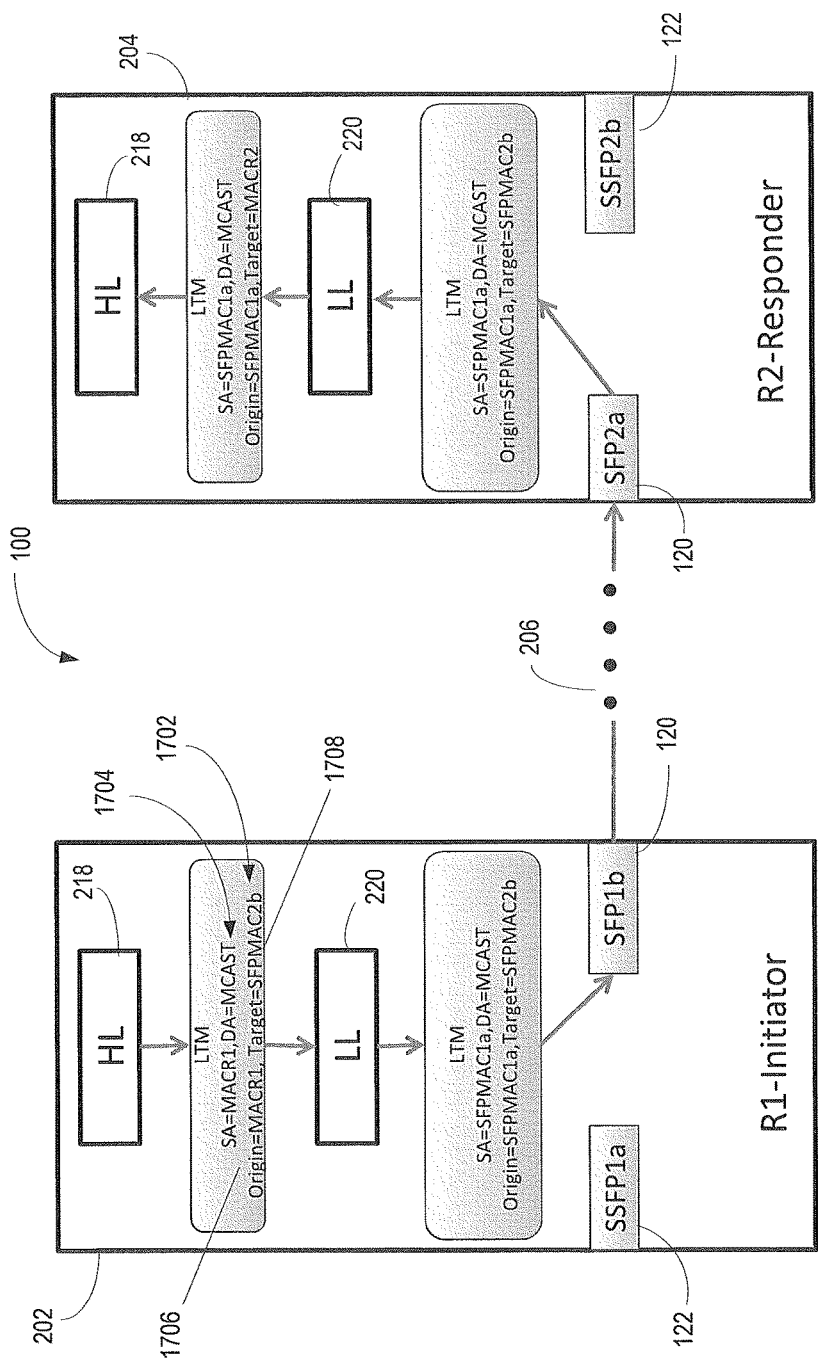
FIG. 16 is a block diagram of an example of part of the network performance diagnostics system communicating a link trace message.

FIG. 16 is a block diagram of operation of the network performance diagnostics system 100 to transmit a link trace (LT) message as an MEP message from the first network device 202 to the second network device 204, which is similar in configuration and functionality in at least some respects to the previously discussed embodiments, accordingly, for purposes of brevity, the discussion will not be repeated. A link trace protocol from which the LT message (LTM) packet is generated may be used for path discovery and fault isolation, such as by using an Ethernet trace route. A network device, such as an MEP can transmit a multicast message (LTM) in order to discover other network devices such as maintenance points (MPs), and a path to an MIP or an MEP in the same maintenance area (MA). Using the linktrace protocol, each MW along the path, and the terminating MP may return a unicast linktrace response (LTR) to the network address from which the linktrace message originated. In FIG. 16, along the packet path as indicated by arrows, portions of the network devices, such as the CPU and the ASIC have been omitted for clarity.

The linktrace message (LTM) may be generated by the high-level circuitry 218 of the first network device 202 to including a first header, or LTM header 1702 and a second header, or layer2 header 1704. The first header 1702 may include an origin 1706, which may be a unique address of the network device generating the LTM, such as the network device address of the first router device 202 such as MACR1. The first header 1702 may also include a target address 1708, which may be a unique address of the boundary communication interface device, such as a MAC address SFPMAC2*b*. The second header 1704 may include a source address (SA), such as the unique network device address (MACR1) and a destination address (DA) such as a multicast address (MCAST). In some embodiments, the addresses in the first and second headers 1702 and 1704 may all be different, or some may be the same. As in previously discussed embodiments, the tables stored in respective databases (DB) in the first and second network devices 202 and 204 have been populated with unique addresses.

In the example of FIG. 16, the second header 1704 may include a source address (SA) which is the same as the source address (SA) of the first header 1702, and a destination address (DA) which may be a multicast address such as MCAST. The LTM packet may be passed to the low-level circuitry 220, which may change the origin address in the first header 1702 to a unique address of the boundary communication interface device 122 (SSFP1*a*) of the first network device 202, and also change the source address (SA) of the second header L2 to a unique address of the boundary communication interface device 122 (SSFP1*a*) of the first network device 202 as previously discussed. The address selection for conversion is done so that the ASIC 214 does not learn this address if received as a source address, and floods the packet if the packet is received with this address as destination address.

The low-level circuitry 220 may route the LTM packet to the internal communication interface device 120 (SFP1*b*) via the ASIC 214 of the first network device 202. Routing by the low-level circuitry may be based on logic included in the low-level circuitry 220. The internal communication interface device 120 (SFP1*b*) can transmit the LTM packet over the network 206 for receipt by the internal communication interface devices 120 (SFP2*a*) included in the second network device 204.

Since the destination address is a multicast, the LTM packet may be punted to the CPU 210. The LTM packet may then be forwarded to the low-level circuitry 220, through the ASIC 214. In the low-level circuitry 220, the target address SFPMAC2b in LTM Header 1702 may be changed to the unique network device address of the second network device 204, such as a MAC address (MACR2). The LTM packet may then be provided to the high-level circuitry 218 for further processing. In embodiments, there is:

1) LTM Message processing at the MEP so that an LTR message responsive to the LTM may be generated and sent. In addition, there is LTM message processing at the MIP so that the LTR messages are sent.

Figure 17:
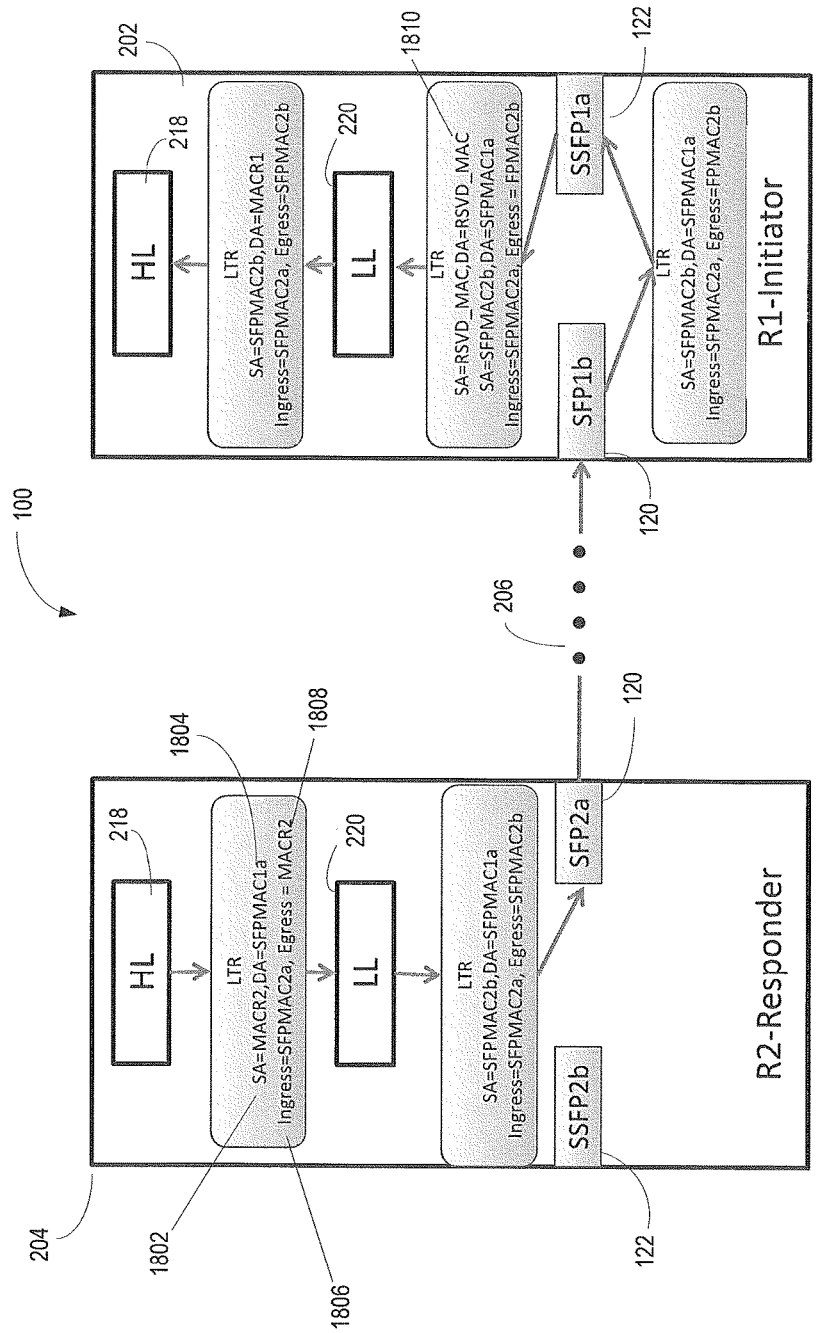
FIG. 17 is a block diagram of an example of part of the network performance diagnostics system communicating a link trace response.
Figure 18:
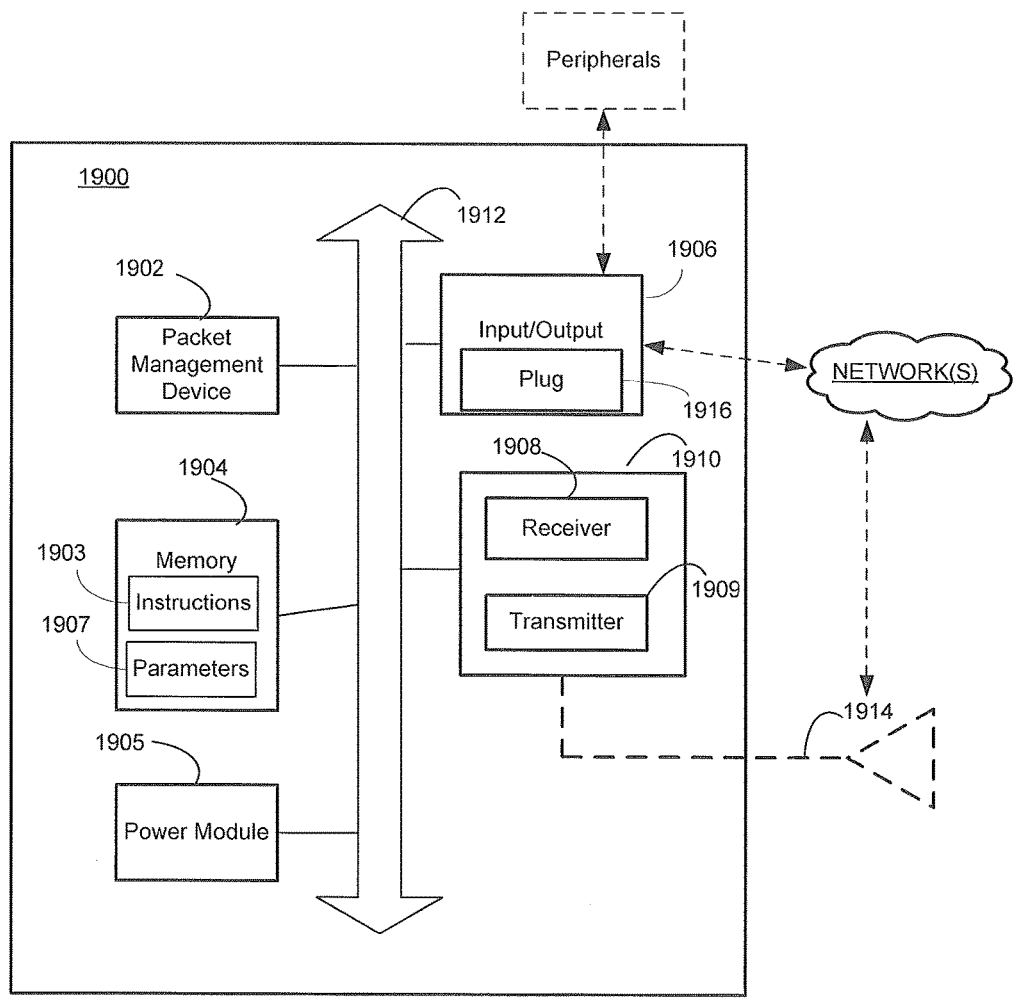
FIG. 18 is block diagram example of at least part of a network performance diagnostics system.

FIG. 17 is a block diagram of example operation of the network performance diagnostics system 100 to transmit a linktrace (LT) response as a response from the second network device 204 to the first network device 202. The LT response (LTR) may be generated by the high-level circuitry 218 of the second network device 204, in response to receipt of the LT message discussed with reference to FIG. 16, which is similar in at least some respects to the DM response message discussed with reference to FIG. 11. For purposes of brevity, the previously described features and functionality will not be repeated. In FIG. 18, along the packet path as indicated by arrows, portions of the network devices, such as the CPU and ASIC have been omitted for clarity.

In this example embodiment, the LT response (LTR) packet may be generated as a message using the high-level circuitry 218 of the second network device 204 with a source address (SA) 1802 which is the network device address of the network device, such as a MAC address (MACR2), and a destination address (DA) 1804 of the interface device address of the boundary communication interface device 122 (SFP1a), such as SFPMAC1a, that was included as the source address in the LT message to which this is a response. In addition, the LTR packet may include an ingress interface address 1806 which is the address of the communication interface device through which the LT message to which this is a response ingressed the network device, such as SFPMAC2a; and an egress interface address 1808 which is the address of the MEP that is responding to the LT, such as MACR2. The LTR packet may be received by the low-level circuitry 220, and the source address may be translated by the low-level circuitry 220 to an interface device address of the boundary communication interface device 122 (SSFP2b), such as SFPMAC2b. Similarly, the egress interface address may be translated by the low-level circuitry 220 to an interface device address of the boundary communication interface device 122 (SSFP2b), such as SFPMAC2b. Following the translation of the source address and egress interface address, the low-level circuitry 220, may route the LT response packet to the internal communication interface device 120 (SFP2a) via the ASIC 214 of the second network device 204 without the ASIC 214 learning the address of the boundary communication interface device 122, as previously discussed with reference to FIG. 16. The internal communication interface device 120 (SFP2a) can transmit the LT response over the network 206 for receipt by the internal communication interface device 120 (SFP1b) included in the first network device 202. Upon receipt of the LT response, the first network device 202 may operate similarly to the second network device 204 discussed with reference to FIG. 16 to flood the packet, add a second header 1810 and change the destination address (DA) in the first header to the unique network device address, such as MACR1, as discussed with reference to FIG. 9, except the boundary communication interface device 122 (SSFP1a) of this embodiment does not add operational parameters to the LTR packet, since no such operational parameters are needed in an LTR.

In other embodiments, other control protocol packet messages can be generated and sent. With regard to LT messages, there can be LTM packets transmitted from a MEP, LTM received at a MIP, an LTM transmitted (forwarded) by a MIP, an LTM received at a MEP, an LTR transmitted from a MW, and an LTR received at a MEP.

Integration of the communication interface devices (SFP) in a network device, such as a bridge or router, may be accomplished with a number of example approaches which can be used for implementations in the previously discussed example embodiments. In the following discussion, the unique addresses are identified as MAC addresses, however, in other examples, any other form of unique addresses may be used.

As previously discussed FIGS. 1-17 describe functionality and features of illustrated R1 and R2 network devices, such as routers or switches, as a responder and an initiator. In other examples, any number of network devices may be illustrated. In general, each of R1 and R2 may include a first processor, such as a CPU, and/or a second processor, such as an ASIC or FPGA, both of which are capable of executing logic. In addition, each of R1 and R2 may include one or more interface devices that are enhanced communication interface devices and standard communication interface devices, as previously discussed. The CPU may interact with high-level circuitry (HL), such as in a network layer, and low-level circuitry (LL), such as in a device layer. The HL circuitry may access a maintenance endpoint (MEP) table, such as in a database (DB), which is populated with addresses. The addresses may be obtained from a data source, such as a database of peers. The data source may be populated by learning the source addresses of other network devices.

Each network device may include an operating system of the device upon which the low-level circuitry resides. The low-level circuitry may also include one or more tables populated with conversion information for converting the unique addresses. Communication between the devices R1 and R2 using the internal communication interface devices may be over a network using an optical connection. This may be a user network interface (UNI), which may be a demarcation between a service provider (SP) and a subscriber; an external network-to-network interface (ENNI), which may be a demarcation between provider networks; or an internal network-to-network interface (INNI), which is internal to a provider network. In addition, boundary communication interface devices may communicate over a network. The internal communication interface device or the boundary communication interface device or both may use an enhanced communication interface device for communication. Alternatively, a standard communication interface device may be used for the internal communication interface device, and an enhanced communication interface device may be used for the boundary communication interface device. The initiating device may use an enhanced communication interface device as the boundary communication interface device while the responding device uses only standard communication interface devices, or the initiating device may use only standard communication interface devices while the responding device uses an enhanced communication interface device for the boundary interface communication device, or both devices may use enhanced communication interface devices for the boundary interface communication devices. The packet path for control protocol packets may include CC (continuity/keepalive check), LMM (loss measurement message), LMR (loss measurement response), DMM (delay measurement message), DMR (delay measurement response), LTM (link trace message), LTR (link trace response), LBM/LBR (loop back message/response) or other types of message.

In embodiments, an alternative model for avoiding MAC moves in the transmitting device can be used instead of the previously discussed model in an implementation of the high-level circuitry and the low-level circuitry. In this embodiment, each boundary communication interface device has two unique interface device addresses, as described previously: a primary address, such as the burnt-in address, and a secondary address. In this embodiment, a fixed entry in the database in ASIC 214 for the communication interface address is not used. Instead, when the initiator (R1) network device 202 wants to generate and send a control protocol packet, the low-level circuitry in an initiator (R1) network device converts the source address to the primary address of the boundary communication interface device 122. The packet is directed to the boundary communication interface device 122 by the low-level (LL) circuitry regardless of the type of packet. In addition, the low-level circuitry can also program the enhanced SFP on the boundary communication interface device to send the control protocol packet back to the electrical side, such as to an FPGA or ASIC. In these embodiments, the boundary communication interface device may convert the source address in the generated control protocol packet from the primary interface address, such as the burnt-in address, to the secondary communication interface address, using a previously stored conversion mechanism, such as a table. The boundary communication interface device can send the frame back to electrical side, such as to the FPGA or ASIC. From here the frame can get bridged to an internal communication interface device because of the learnt destination address MAC (DestMAC) from previous received packets. Since the frame has a different source address when it flows through the ASIC from the low-level circuitry to the boundary communication interface device and when it flows through the ASIC from the boundary communication interface device to the internal communication interface device, both addresses can be learned by the ASIC. In example embodiments where the addresses are MAC addresses, there is no MAC move. The ASIC learns that the low-level circuitry is the location for the primary address and the boundary communication interface device is the location for the secondary address.

Similarly, when a frame is received on the internal communication interface device of the responder (R2) network device, the internal communication interface device can forward the frame to the ASIC. If the location of the destination address is known, for example it is the secondary address of one of a plurality of boundary communication interface devices in the responder network device, and the address has been learnt due to a previous transmitted frame, the ASIC can send the received frame to the boundary communication interface device. If the destination address is not known, the ASIC can flood the frame to a plurality of the communication interface devices, as illustrated in the example of FIG. 7. The boundary communication interface device with the secondary interface device address that matches the destination address, such as a MAC Address, will accept this frame. All other communication interface devices will drop this frame since the secondary interface device address will not match. The boundary communication interface device which accepted the packet can change the destination address (DA) from the secondary interface device address, to the primary address of the boundary communication interface device, such as the burnt-in address, using a previously stored conversion mechanism, such as a table, and send the control protocol packet to the electrical side, such as to the FPGA or ASIC. The boundary communication interface device can add an additional header before sending the packet back to the electrical side, as described previously.

In this embodiment, the exposed address (secondary interface device address) can be used by remote devices to perform fault management or performance monitoring such as continuity check measurement (CCM) and G.8013 performance monitoring (PM), and the primary interface device address of the communication interface device can be used within the network device to tunnel the packets, such as LM/DM packets, between a boundary communication interface device and the CPU.

The enhanced SFP can insert operational parameters, such as timestamp/statistics, while sending a control protocol frame with its own secondary interface device address as source address OR when it receives a control protocol frame with its own secondary interface device address as destination address. When the frame is punted to the CPU, the Enhanced SFP can add an additional L2 header and can send the frame to the ASIC as discussed with reference to at least FIGS. 6, and 10-12.

In an UP MEP case, the Enhanced SFP can send the control protocol frame to the electrical side, such as the ASIC 214, when it receives a control protocol frame that includes as the source address (SA) or the destination address (DA) as its own primary or secondary interface device address. In Down MEP case, the Enhanced SFP may not send the control protocol frame back to electrical side and could use the primary or secondary interface device address.

Enhanced SFP Functionality of Embodiments:

In example embodiments an Enhanced SFP can modify a control protocol packet if it has a matching maintenance endpoint (MEP) configured on it. In these embodiments, it is assumed that the boundary communication interface devices 122 are enhanced SFP's, and the internal communication interface devices 120 are standard SFP's.

In example functionality for packets coming from the optical side, which are received from the network 216 via the boundary communication interface device 122, the enhanced SFP can:

Insert operational parameters such as received packet count statistics on loss measurement request message (LMM) frames which include the enhanced SFP's own interface device address as the destination address (DA).

Insert operational parameters such as received packet count statistics on loss measurement response message (LMR) frames which include the enhanced SFP's own interface device address as the DA.

Insert operational parameters such as receive timestamp statistics on delay measurement request message (DMM) frames which include the enhanced SFP's own interface device address as DA.

Insert operational parameters such as receive timestamp statistics on delay measurement response (DMR) frames which include the enhanced SFP's own interface device address as DA.

Example functionality for packets coming from the electrical side, which are packets received from the CPU 212 via the ASIC 214, or from the network 206 via the internal communication interface device 120, the enhanced SFP can:

Insert operational parameters such as transmitted packet count statistics on LMM frames for packets received via the ASIC 214 which have the enhanced SFP's own interface device address as the source address (SA).

Insert operational parameters such as transmitted packet count statistics on LMR frames for packets received via the ASIC 214 which have the enhanced SFP's own interface device address as the source address (SA).

Insert operational parameters such as transmit timestamp statistics (TxTSf) on DMM frames for packets received via the ASIC 214 which have the enhanced SFP's own interface device address as the source address (SA).

Insert operational parameters such as transmit timestamp statistics (TxTsb) on DMR frame for packets received via the ASIC 214 which have the enhanced SFP's own interface device address as the source address (SA).

Inserts operational parameters such as receive operational parameters such as timestamp statistics (RxTSf) on DMM frame, operational parameters on LMM frame or operational parameters on LMR frame for packets received via the ASIC 214 which have the enhanced SFP's own interface device address as the destination address (DA).

Inserts operational parameters such as receive timestamp statistics (RxTSb) on DMR frames for packets received via the ASIC 214 which have the enhanced SFP's own interface device address as the destination address (DA).

Sends control protocol frames, such as LMM, LMR, DMM, DMR frames, with source address (SA) as its own interface device address back to the electrical side via the ASIC 214 (see for example FIGS. 9-11).

Sends control protocol frames, such as LMM, LMR, DMM, DMR, LBM, LBR frames, with destination address (DA) as its own interface device address back to electrical side with destination address (DA) set to the device address (see for example FIGS. 9-13 and 15) via adding the additional second header.

In embodiments, as previously discussed, the SFP can add an additional ethernet header with an address, such as an SMAC which is a reserved dedicated address, such as a MAC address, and all other fields remaining the same as the original ethernet header, as illustrated, for example, in FIG. 8*b*.

Drops the frames with destination address (DA) of some other enhanced SFP on the same network device, as illustrated, for example, in FIG. 4.

A previously discussed first example embodiment may use a Device Address Model in the high-level (HL) circuitry 218 and the low-level (LL) circuitry 220. In this example, a network device address (device MAC address) is a known and stored MAC Address, so receiving control protocol packets having the device MAC Address as destination address (DA) can be punted to a processing unit, such as the CPU, of the destination network device, such as a router or switch. In this first embodiment of the network performance diagnostics system a model to translate device addresses to specific MAC Addresses can be used to avoid punting control protocol packets to the CPU of the destination network device. In this first embodiment, a 1:N mapping can be used so this model can be adopted when traffic is flooded and appropriate filtering can be implemented.

In a variant of this embodiment, the specific address is the unique address of a communication interface device in the network device. In another variant, the specific address is a secondary address of a communication interface device in the network device. In either case, the address does not have a known location in the network device, such as a router device, so this address can be flooded in order to reach the communication interface device to which the address belongs. The rest of the communication interface devices can filter (disregard) the packet if the address is not theirs. This approach does not require an internal interface with address translation capability. The low-level circuitry can change the communication interface device address to the network device address when passing the packet to the high-level circuitry or vice versa when receiving the packet from the high-level circuitry A second example embodiment may use a Primary Interface Model for high-level circuitry 218 and low-level circuitry 220. In this example, a Primary Interface Address is a known and stored Address, so receipt of packets having such a destination address could be punted to the CPU of the destination device. In this second embodiment, a secondary address is used internally within the network device when transmitting packets between the CPU or an internal communication interface device and a boundary communication interface device. The Primary Interface Address to secondary interface device address translation logic, such as a translation table can be used in an internal communication interface device 120. The communication interface device of this second embodiment may be an enhanced SFP provided with address translation capability.

In the second embodiment:

Packets can be transmitted by the high-level circuitry 218 using the primary address of the boundary communication interface device 122 as the source address.

The low-level circuitry 220 can forward the packet via the ASIC 214 to the boundary communication interface device 122. The ASIC 214 thus learns that the CPU 212 is the location of the primary address. Alternatively, the low-level circuitry 220 can change the source address from the primary address of the boundary communication interface device 122 to the secondary address.

When the boundary communication interface device 122 receives a packet from the electrical side with its primary or secondary interface device address as the source address, it can change the source address from the primary address to the secondary address, if this has not already been done by the low-level circuitry 220. It can also add operational data if appropriate. It can then forward the packet via the ASIC 214 to the internal communication interface device 120 for transmission over the network 206. The ASIC 214 learns that the boundary communication interface device 122 is the location of the secondary address. Alternatively, a fixed entry can be used to prevent learning of the secondary address as described previously. A fixed entry is necessary if the translation from the primary to the secondary address is done by the low-level circuitry 220.

When the internal communication interface device 120 receives the packet from the electrical side with the source address set to the secondary address of a boundary communication interface device 122, it can change the source address back to the primary address of the boundary communication interface device 122 and transmit the packet to the network 206. This can be done by means of a table that maps the secondary device address of each boundary communication interface device within the network device to the primary address of the boundary communication interface device, or by other means.

When packets are received by the internal communication interface device 120 from the optical side with the destination address of the primary interface address of a boundary communication interface device 122, the destination address can be changed to the secondary interface device address of the boundary communication interface device 122 by the internal communication interface device 120, before sending the packets towards the ASIC 214. This can be done by means of a table that maps the primary device address of each boundary communication interface device within the network device to the secondary address of the boundary communication interface device, or by other means.

A network device can flood packets received with a secondary interface device address, if the location of the address has not be learned in the system.

If a boundary communication interface device 122 receives a packet with its own secondary interface device address as DA from the electrical side, such as from the CPU 212 or the ASIC 214, then boundary communication interface device 122 can change the destination address to the primary address and send the packet to the CPU 212 via the ASIC 214. The boundary communication interface device can insert an additional header as described previously.

If a boundary communication interface device 122 receives a packet with the secondary interface device address of another communication interface device in the same network device, the boundary communication interface device 122 can drop the packet, as described previously.

If a communication device is not an enhanced communication interface device then filtering for the flood traffic can be accomplished at the network device level, such as at the Router Level, via the means of Egress ACL or other means.

An enhanced communication interface device can maintain its own primary and secondary interface device addresses, as well as all the unique primary and secondary interface device addresses of other communication interface devices in a memory storage, such as in a list in a database. This can be used for filtering the packet and translating the source and destination addresses.

DM/LM packet generation or responding to DMM/LMM packet may or may not occur in the enhanced communication interface device instead of in the high-level circuitry.

Time stamping and packet counting statistics can be done in the enhanced communication interface device.

A third example embodiment can use primary interface address mode for the high-level circuitry 218 and secondary interface device address mode for the low-level circuitry 220. This example is similar to the first embodiment, except that the high-level circuitry uses the primary address of the communication interface device rather than the network device address. The internal interface of this example embodiment need not include address translation capability. The low-level circuitry can change the secondary interface device address to the primary interface address when passing the packet to the high-level circuitry or vice versa when receiving the packet from high-level circuitry.

In the first and third embodiments:

The boundary interfaces 122 of R1 and R2 can have enhanced communication interface devices, whereas the internal interfaces 120 can have standard communication devices, as illustrated in FIGS. 2, 5-6 and 10-17.

High-level circuitry (HL) can operate in device address mode, or primary interface address mode. In other words the high-level circuitry uses a network device address or a primary interface address for control protocol packets. The low-level circuitry can perform the translation from the network device address or the primary interface address to a secondary interface address or vice versa depending on packet direction.

Since the source address is set to the secondary address when the packet is transmitted over the network 206, other devices can use the secondary address as the destination address when sending response packets.

Learning can be disabled for the secondary address in the ASIC 214. When packets are received with the secondary address as the destination address, the packet can be flooded to all boundary communication interface devices 122 within the network device, and can be forwarded to the low-level circuitry by only the boundary communication interface device 122 with the matching secondary interface address.

The communication interface device can insert timestamp/statistics while sending a control protocol frame with its secondary interface device address as source address OR when it receives a control protocol frame with its secondary interface device address as destination address. When there is a need to send the frame to the CPU, the communication interface device can add an additional header, such as an L2 header, with a previously reserved SA and DA (see for example FIG. 10) and send the frame to the electrical side. The additional L2 header may be added to avoid exposure of the remote interface device addresses via boundary interfaces. In the Up MEP case, the communication interface device can send the control protocol frame to the electrical side when it receives the control protocol frame with its own device address as source address/destination address (SA/DA). In Down MEP case, the communication interface device does not send the control protocol frame back to the electrical side when it receives the frame from the electrical side.

In the first and third embodiments:

high-level circuitry 218 can generate the UP MEP packet with Device Address or Primary Interface Address. But low-level circuitry could change the Device Address or Primary Interface Address to secondary interface device address for all types of packets, such as G.8013 Packets.

low-level circuitry 220, when it gives packets to the high-level circuitry, can change the address, such as the secondary interface device address, to Device Address or Primary Interface Address.

When R1 or R2 receives the packet with secondary interface device address it can flood the packet, as illustrated in the example of FIG. 4. This secondary interface device address should remain an unlearnt Address in the Router System, as illustrated in the examples of FIGS. 3 and 4.

If an boundary communication interface device receives the packet with an address of the boundary communication interface device, such as secondary interface device address, as the DA from the electrical side then the boundary communication interface device can terminate the packet, otherwise it can drop the packet.

If the interface device is not an enhanced communication interface device then filtering can be done at the Router Level via the means of EgressACL or other means to identify control protocol packets.

A communication interface device can keep its reserved address stored in the database, as well as all the secondary interface device addresses in the list. This can be used for filtering the packet.

All control protocol packets, except CCM packets, can be sent to the communication interface device. CCM packets may include a multicast address, such as MulticastMAC, so there is no need to send CCM packets to the Enhanced SFP device if these packets are already processed in any other way.

DM/LM packet generation or responding to DMM/LMM packets may or may not occur in the Enhanced SFP.

Operational parameters, such as timestamping and Stats can be done in the Enhanced SFP as illustrated in the examples of FIGS. 6, and 9-11.

DM/LM packets received from the electrical side can be punted to the CPU with an additional second Header in order to avoid learning the remote SA as the boundary interface so that the MAC Move of Remote MAC address can be avoided.

When the CPU needs to generate the DMM/DMR or respond to the DMM/DMR then it can send the packet to the boundary interface for the UP MEP with source address (SA) as secondary interface device address. For example, when the communication interface device receives the packet from the electrical side with the source address (SA) as secondary interface device address then it can change the secondary interface device address to network device address or Primary Interface Address and send the packet towards the electrical side so that packet can go towards the internal side of the interface.

The network performance diagnostics system can identify various methods via which a communication interface device, such as an external pluggable transceiver, can be integrated in order to provide the delay measurement and loss measurement functionality to an existing set of Switches/Routers which may not have the capability to provide such functionality. The network performance diagnostics system can identify all the software requirements for the existing set of routers/switches and include hardware specifications for the interface devices, such as the communication interface device. The communication interface device may be developed with one or all possible embodiments described herein in order to provide better integration capability with existing sets of routers/switches.

The network performance diagnostics system can look at all possible combinations of methods so that it is easier for different router/switches with varying functionality to integrate the overall solution in a short span of time. Some of the methods described are in situations where all interface devices are enhanced devices, as well as situations where there are only some enhanced communication interface devices. The network performance diagnostics system may also be configured with different deployment models depending on customer requirement and can provide a cost efficient solution.

Sending Ingress Interface to HL while Punting the Frame.

In an embodiment, the HL circuitry can expect the actual ingress interface to be present in the metadata passed along with the packet when LL punts any control protocol frame. In the network performance diagnostics system, the frame can be punted from an interface on which a MEP is configured. The HL circuitry might fail to find the MEP associated with the frame, if this is not the actual ingress interface, i.e. the interface at which the frame was received by the network device. In one example, CC frames can be punted from the actual ingress interface. A database (DB) in the LL circuitry can be populated with the correct interface using the CC messages. To punt other control protocol frames, the DB can be queried with the source address present in the frame to get the actual ingress interface.

Accounting CC Frames for LM Stats

In an embodiment of the network performance diagnostics system, in the case of an Up MEP, the CC messages may not be made to traverse the interface on which the MEP is configured. So the CC messages may not get accounted for in the packet count statistics maintained on the network performance diagnostics system. This might show up as frame loss in a loss measurement analysis.

Up MEP when Internal Interface is Down

When there is an UP MEP on a boundary interface, in an embodiment, control protocol frames may be sent towards the internal interface and received packets may be processed even when the boundary interface is down. In some examples, the second processor, such as an ASIC, can drop the frame fed back by the internal communication interface device since the target boundary interface is down. In this example, LM/DM testing on a communication interface device may not be available when the boundary communication interface device interface is down.

FIG. 18 illustrates a block diagram of an example communication interface device 1900. The communication interface device 1900, which can be a single electronic device or a combination of multiple electronic devices, may include a packet manager device 1902, memory 1904, a power module 1905, input/output (I/O) 1906, a receiver 1908 and a transmitter 1909 (or a transceiver 1910) and/or a communication bus 1912 that connects the aforementioned elements of the communication interface device 1900. The input/output (I/O) 1906 may include a port for communication over a network. Optionally, or in addition, in some embodiments, the input/output (I/O) 1906 may include input/out signals, one or more display devices, one or more sensors, and internal, peripheral, user, and network interfaces. In some embodiments, the communication interface device 1900, can optionally include an antenna 1914 for wireless communications. In the embodiment of a pluggable SFP, the input/output (I/O) 1906 includes a plug connection 1916, such as a USB, a card slot edge, or some other mechanism that allows the communication interface device 1900 to be plugged into, or removeably installed in a network device.

The packet manager device 1902 can include circuitry in the form of a processing device, such as a central processing unit (CPU) and/or a field programmable gate array (FPGA). Also, for example, the packet manager device 1902 can be central processing logic; central processing logic may include hardware and firmware, software, and/or combinations of each to perform function(s) or action(s), and/or to cause a function or action from another component. Also, based on a desired application or need, central processing logic may include a software controlled microprocessor, discrete logic such as an application specific integrated circuit (ASIC), a programmable/programmed logic device, memory device containing instructions, or the like, or combinational logic embodied in hardware. In any of these examples, hardware and/or software instructions, such as instructions 1903 included in the memory 1904, may implement example aspects of the communication interface device 1900. In addition, operational parameters 1907 may be stored in the memory 1904. The memory 1904, such as RAM or ROM, can be enabled by one or more of any type of memory device, such as a primary (directly accessible by the CPU) or a secondary (indirectly accessible by the CPU) storage device (e.g., flash memory, magnetic disk, optical disk).

The power module 1905 can include one or more power components, to provide supply and/or management of power to the communication interface device 1900. The input/ output 1906, can include any interface for facilitating communication between any components of the communication interface device 1900, components of external devices (such as components of other devices), and users. For example, such interfaces can include a network card that is an integration of the receiver 1908, the transmitter 1909, and one or more I/O interfaces. The network card, for example, can facilitate wired or wireless communication with other nodes. In cases of wireless communication, the antenna 1910 can facilitate such communication. In other examples of the communication interface device 1900, one or more of the described components may be omitted.

Various embodiments described herein can be used alone or in combination with one another. The foregoing detailed description has described only a few of the many possible implementations of the present embodiments. For this reason, this detailed description is intended by way of illustration, and not by way of limitation. Furthermore, the separating of example embodiments in operation blocks or modules described herein or illustrated in the drawings is not to be construed as limiting these blocks or modules as physically separate devices. Operational blocks or modules illustrated or described may be implemented as separate or combined devices, circuits, chips, or computer readable instructions.

Each module described herein is circuitry in the form of hardware, or a combination of hardware and software. For example, each module may include and/or initiate execution of an application specific integrated circuit (ASIC), a Field Programmable Gate Array (FPGA), a circuit, a digital logic circuit, an analog circuit, a combination of discrete circuits, gates, or any other type of hardware, or combination thereof. Accordingly, as used herein, execution of a module by a processor can also refer to logic based processing by the module that is initiated directly or indirectly by a processor to complete a process or obtain a result. Alternatively or in addition, each module can include memory hardware, such as at least a portion of a memory, for example, that includes instructions executable with a processor to implement one or more of the features of the module. The memory, as described herein, does not include transitory signals. When any one of the modules includes instructions stored in memory and executable with the processor, the module may or may not include the processor. In some examples, each module may include only memory storing instructions executable with a processor to implement the features of the corresponding module without the module including any other hardware. Because each module includes at least some hardware, even when the included hardware includes software, each module may be interchangeably referred to as a hardware module.

Each module may be circuitry that can execute instructions stored in a non-computer readable medium, such as memory 1904 of FIG. 18, which may be executable by circuitry, such as one or more processors, included in packet manager 1902 of FIG. 18. Hardware modules may include various devices, components, circuits, gates, circuit boards, and the like that are executable, directed, or controlled for performance by circuitry that may include a processor device. Further, modules described herein may transmit or received data via communications interfaces via a network, such as or including the Internet. Also, the term "module" may include a plurality of executable modules.

While various embodiments of the invention have been described, it will be apparent to those of ordinary skill in the art that many more embodiments and implementations are possible within the scope of the invention. Accordingly, the invention is not to be restricted.

The invention claimed is:

1. A method comprising:
at a first network device:
generating a link trace protocol packet used to perform fault management or performance monitoring of a network, the link trace protocol packet including a source address of the first network device and a destination address for a multicast address, wherein the link trace protocol packet is generated by high-level circuitry in the first network device;
changing, by low-level circuitry in the first network device, the source address included in the link trace protocol packet, prior to transmitting the link trace protocol packet, from a first network device address of the first network device to a second network device address of a boundary communication interface of the first network device, wherein the first network device address uniquely identifies the first network device, wherein the second network device address uniquely identifies the boundary communication interface, and wherein the first network device address is different than the second network device address;
routing, by the low-level circuitry in the first network device, the link trace protocol packet to an internal communication interface of the first network device; and
transmitting, by the internal communication interface, a multicast message over the network to the multicast address included in the destination address of the link trace protocol packet generated by the first network device, wherein the multicast message includes the link trace protocol packet.

2. The method of claim 1, further comprising:
including a target address in the link trace protocol packet to a unique network device address of a boundary communication interface of a second network device.

3. The method of claim 1, wherein the routing by the low-level circuitry in the first network device is based on logic included in the low-level circuitry in the first network device.

4. The method of claim 1, wherein the low-level circuitry in the first network device routes the link trace protocol packet via an Application Specific Integrated Circuit (ASIC) in the first network device.

5. The method of claim 1, further including receiving, from a second network device in the network, a response message to the multicast message.

6. The method of claim 5, wherein a destination address included in the response message is the second network device address of the boundary communication interface of the first network device.

7. The method of claim 5, wherein receiving the response message comprises receiving the response message by the low-level circuitry of the first network device.

8. The method of claim 7, further comprising the low-level circuitry in the first network device changing a source address included in the response message to an interface address of a boundary communication interface of the second network device.

9. The method of claim 5, wherein the second network device is a Maintenance Intermediary Point ("MIP").

10. The method of claim 1, wherein the first network device is a Maintenance End Point ("MEP").

11. A method comprising:
at a second network device:
receiving over a network, from a first network device, a multicast message that includes a link trace protocol packet used to perform fault management or performance monitoring of the network, wherein the link trace protocol packet is generated by high-level circuitry in the first network device;
in response to receiving the multicast message including the link trace protocol packet, generating a response message to the multicast message, wherein the response message is generated by high-level circuitry in the second network device and includes a source address of a first network device address of the second network device;
changing, by low-level circuitry in the second network device, the source address included in the response message to the link trace protocol packet, prior to transmitting the response message, from the first network device address of the second network device to a second network device address of a boundary communication interface of the second network device, wherein the first network device address uniquely identifies the second network device, wherein the second network device address uniquely identifies the boundary communication interface, and wherein the first network device address is different than the second network device address;
routing, by the low-level circuitry in the second network device, the response message to an internal communication interface of the second network device; and
transmitting, by the internal communication interface of the second network device, the response message to the first network device.

12. The method of claim 11, wherein routing includes routing with the low-level circuitry in the second network device the response message via an Application Specific Integrated Circuit (ASIC) in the second network device such that the ASIC in the second network device does not learn the second network device address of the boundary communication interface of the second network device.

13. The method of claim 11, wherein a destination address included in the response message is an address of a boundary communication interface included in the first network device.

14. The method of claim 13, wherein the response message is configured to be routed to low-level circuitry in the first network device.

15. An apparatus comprising:
high-level circuitry configured to generate a link trace protocol packet having a source address of a first network device and a destination address for a multicast address that is associated with a second network device;
low-level circuitry configured to change the source address included in the link trace protocol packet, prior to transmitting the link trace protocol packet, from a first network device address of the first network device to a second network device address of a first communication interface, the first communication interface operable as a boundary interface, wherein the first network device address uniquely identifies the first network device, wherein the second network device address uniquely identifies the first communication interface, and wherein the first network device address is different than the second network device address; and
a second communication interface operable as an internal interface, the second communication interface configured to transmit over a network a multicast message that includes the link trace protocol packet to the multicast address included in the destination address of the link trace protocol packet generated by the first network device.

16. The apparatus of claim 15, wherein the low-level circuitry is further configured to change a target address included in the link trace protocol packet to a unique network device address of the second network device.

17. The apparatus of claim 15, wherein the low-level circuitry is further configured to route the link trace protocol packet based on logic included in the low-level circuitry in the first network device.

18. The apparatus of claim 15, wherein the low-level circuitry is further configured to route the link trace protocol packet via an Application Specific Integrated Circuit (ASIC) in the first network device.

19. The apparatus of claim 15, wherein the second communication interface is configured to receive, from the second network device in the network, a response message to the multicast message.

20. The apparatus of claim 19, wherein the low-level circuitry is configured to change a source address included in the response message to an interface address of a boundary communication interface of the second network device.

* * * * *